(12) United States Patent
Horiba et al.

(10) Patent No.: US 11,346,734 B2
(45) Date of Patent: May 31, 2022

(54) DRIVE DEVICE

(71) Applicant: DENSO CORPORATION, Kariya (JP)

(72) Inventors: Yukio Horiba, Kariya (JP); Masashi Yamasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/376,224

(22) Filed: Apr. 5, 2019

(65) Prior Publication Data

US 2019/0310150 A1    Oct. 10, 2019

(30) Foreign Application Priority Data

Apr. 10, 2018    (JP) .............................. JP2018-075411

(51) Int. Cl.
     *B62D 5/04*           (2006.01)
     *G01L 5/00*           (2006.01)
     (Continued)

(52) U.S. Cl.
     CPC .......... *G01L 5/0085* (2013.01); *B62D 5/0457* (2013.01); *G01L 5/221* (2013.01); *H02K 3/28* (2013.01); *H02P 25/22* (2013.01)

(58) Field of Classification Search
     CPC ..... B62D 5/0457; G01L 5/0085; G01L 5/221; H02K 11/24; H02K 11/33; H02K 3/28;
     (Continued)

(56) References Cited

U.S. PATENT DOCUMENTS 7,347,737 B2 *   3/2008   Horiba ............... H01R 13/6477
                                                       439/676
2009/0203251 A1    8/2009   Takahashi et al.
                    (Continued)

FOREIGN PATENT DOCUMENTS

JP          2003-274537 A      9/2003
JP          2016-32977 A       3/2016
                (Continued)

OTHER PUBLICATIONS

Yamasaki, JP Application No. 2018-075414; Filed Apr. 10, 2018; 32 pages.

*Primary Examiner* — Muhammad S Islam
*Assistant Examiner* — Zemenay T Truneh
(74) *Attorney, Agent, or Firm* — Maschoff Brennan

(57) ABSTRACT

A drive device includes a motor having two sets of winding wires, a controller coaxially disposed with the motor for controlling the motor, and a connector for connecting the controller to an external connector. The controller has a first system control unit for controlling power supplied to one set of winding wires and a second system control unit for controlling power supplied to the other set of winding wires. The connector has a first positive electrode terminal and a first negative electrode terminal for power supplied to the first system control unit, and a second positive electrode terminal and a second negative electrode terminal for power supplied to the second system control unit. A portion of a planar face of the first positive electrode terminal is positioned to overlap a portion of a planar face of the first negative electrode terminal, and a portion of a planar face of the second positive electrode terminal is positioned to overlap a portion of a planar face of the second negative electrode terminal.

9 Claims, 19 Drawing Sheets

(51) Int. Cl.
*H02K 3/28* (2006.01)
*G01L 5/22* (2006.01)
*H02P 25/22* (2006.01)

(58) Field of Classification Search
CPC .......... H02K 5/225; H02K 7/083; H02K 7/14; H02P 25/22; H01R 13/6477
USPC .......................................... 318/700; 439/676
See application file for complete search history.

(56) References Cited

U.S. PATENT DOCUMENTS

| | | | |
|---|---|---|---|
| 2014/0375180 A1 | 12/2014 | Suzuki | |
| 2015/0137636 A1* | 5/2015 | Morimoto | H05K 13/00 |
| | | | 310/71 |
| 2016/0036371 A1* | 2/2016 | Yamasaki | B62D 5/046 |
| | | | 318/400.22 |
| 2017/0158223 A1 | 6/2017 | Abe et al. | |
| 2017/0217481 A1* | 8/2017 | Asao | H02P 25/22 |
| 2017/0294860 A1 | 10/2017 | Yamasaki | |
| 2018/0058962 A1 | 3/2018 | Nakamura et al. | |
| 2019/0140574 A1 | 5/2019 | Yamasaki | |

FOREIGN PATENT DOCUMENTS

| | | |
|---|---|---|
| JP | 2017-108501 A | 6/2017 |
| JP | 6223593 B2 | 11/2017 |
| JP | 2018-32308 A1 | 3/2018 |
| WO | WO 2019/198658 | 10/2019 |

* cited by examiner

DRIVE DEVICE

CROSS REFERENCE TO RELATED APPLICATION

The present application is based on and claims the benefit of priority of Japanese Patent Application No. 2018-075411, filed on Apr. 10, 2018, the disclosure of which is incorporated herein by reference.

TECHNICAL FIELD

The present disclosure relates to a drive device for driving an electric motor.

BACKGROUND INFORMATION

An integrally packaged motor and controller drive device may include an electric motor and a controller for controlling the electric motor packaged together as a single, integral device (e.g., in one housing). Problems may arise when additional controllers are added to such a drive device. As such, drive devices are subject to improvement.

SUMMARY

The present disclosure describes a drive device that limits and/or prevents increases in the size (e.g., diameter) of the drive device and limits and/or prevents increases in noise when additional connectors and terminals are added to the drive device.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
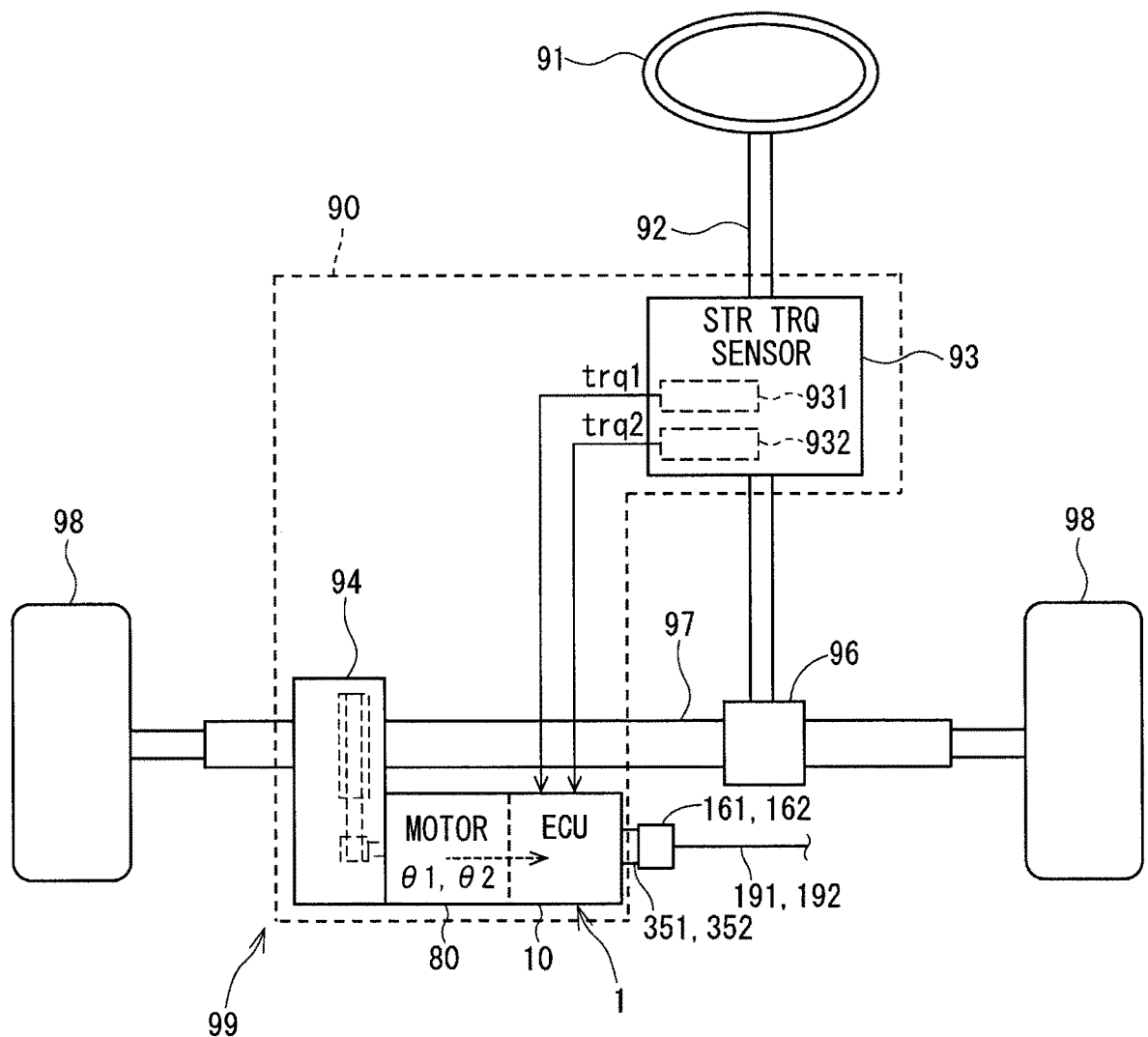
FIG. 1 illustrates a configuration of an electric power steering apparatus.

An integrally packaged motor and controller drive device includes an electric motor and a controller for controlling the electric motor packaged together as a single, integral device in a single housing. Such drive devices may be used in an electric power steering apparatus. In this drive device, the motor has two sets of winding wires, and the controller has two inverters corresponding to the two sets of winding wires (i.e., windings). The controller includes a connector for a power supply terminal and a connector for a signal terminal.

When an additional controller is added to the drive device, an additional power supply connector is added to the drive device for supplying power to the additional controller. Consequently, extra space is required to accommodate the increased number of terminals and the overall diameter of the drive device or controller may need to be increased as a result. Adding additional connectors and terminals may consequently increase the loop area size of the power supply line and such an increase in loop area size may cause an increase in noise on the signal line.

The embodiments are described with reference to the drawings. In the following embodiments, like elements and features among the different embodiments use the same reference numerals, and a repeat description of the like elements and features may be omitted from the description of the latter embodiments.

The drive devices described in the embodiments can be applied to an electric power steering apparatus of a vehicle, and output a steering assist torque.

A configuration of the electric power steering apparatus 90 is described with reference to FIG. 1. The electric power steering apparatus 90 serves as a base, to which the device drivers in each of the embodiments may be applied. FIG. 1 shows an overall configuration of a steering system 99 including an electric power steering apparatus 90. Although the electric power steering apparatus 90 shown in FIG. 1 is a rack assist-type, the apparatus 90 is also applicable to a column assist-type electric power steering apparatus.

The steering system 99 includes a steering wheel 91, a steering shaft 92, a pinion gear 96, a rack shaft 97, wheels 98, and the electric power steering apparatus 90. The steering shaft 92 is connected to the steering wheel 91. The pinion gear 96 is disposed at an end of the steering shaft 92 and engages with the rack shaft 97. Wheels 98 are attached at both ends of the rack shaft 97 via a linkage such as tie rods. When a driver of the vehicle rotates the steering wheel 91, the steering shaft 92 connected to the steering wheel 91 rotates. The rotational motion of the steering shaft 92 is converted into a linear motion by the pinion gear 96 to linearly move the rack shaft 97. The pair of wheels 98 is steered to an angle corresponding to the displacement amount of the rack shaft 97.

The electric power steering apparatus 90 includes a steering torque sensor 93, a control unit 10, a motor 80, and a speed reducer 94. The steering torque sensor 93 is provided at an intermediate portion of the steering shaft 92, and detects a steering torque of the driver. As shown in FIG. 1, the duplexed steering torque sensor 93 may include a first torque sensor 931 to detect a first steering torque trq1 and a second torque sensor 932 to detect a second steering torque trq2 in a duplexed or redundant manner. In alternative configurations where the steering torque sensor is not provided redundantly, a single detected value of one steering torque trq may be used.

The control unit 10 obtains the steering torques trq1, trq2 detected by the steering torque sensor 93, and the electric angles $\theta 1$, $\theta 2$ of the motor 80 detected by a rotation angle sensor (not shown). The control unit 10 controls the drive of the motor 80 to generate a desired assist torque based on information such as the electric angles and the motor current detected inside the control unit 10. The assist torque output from the motor 80 is transmitted to the rack shaft 97 via the speed reducer 94.

The control unit 10 is integrally formed on one side motor 80 (e.g., at one end of the motor 80 along the longitudinal axis of the motor 80). The motor 80 and the control unit 10 are part of a drive device 1. The drive device 1 is an integrated motor/controller-type drive device 1. In the embodiment shown in FIG. 1, the control unit 10 is disposed coaxially with the motor 80 on the side of the motor 80 that is opposite to the output side of the motor 80 (i.e., opposite the output shaft of the motor 80). In other embodiments, the control unit 10 may be arranged coaxially with the motor 80 on the output shaft side of the motor 80.

Figure 2:
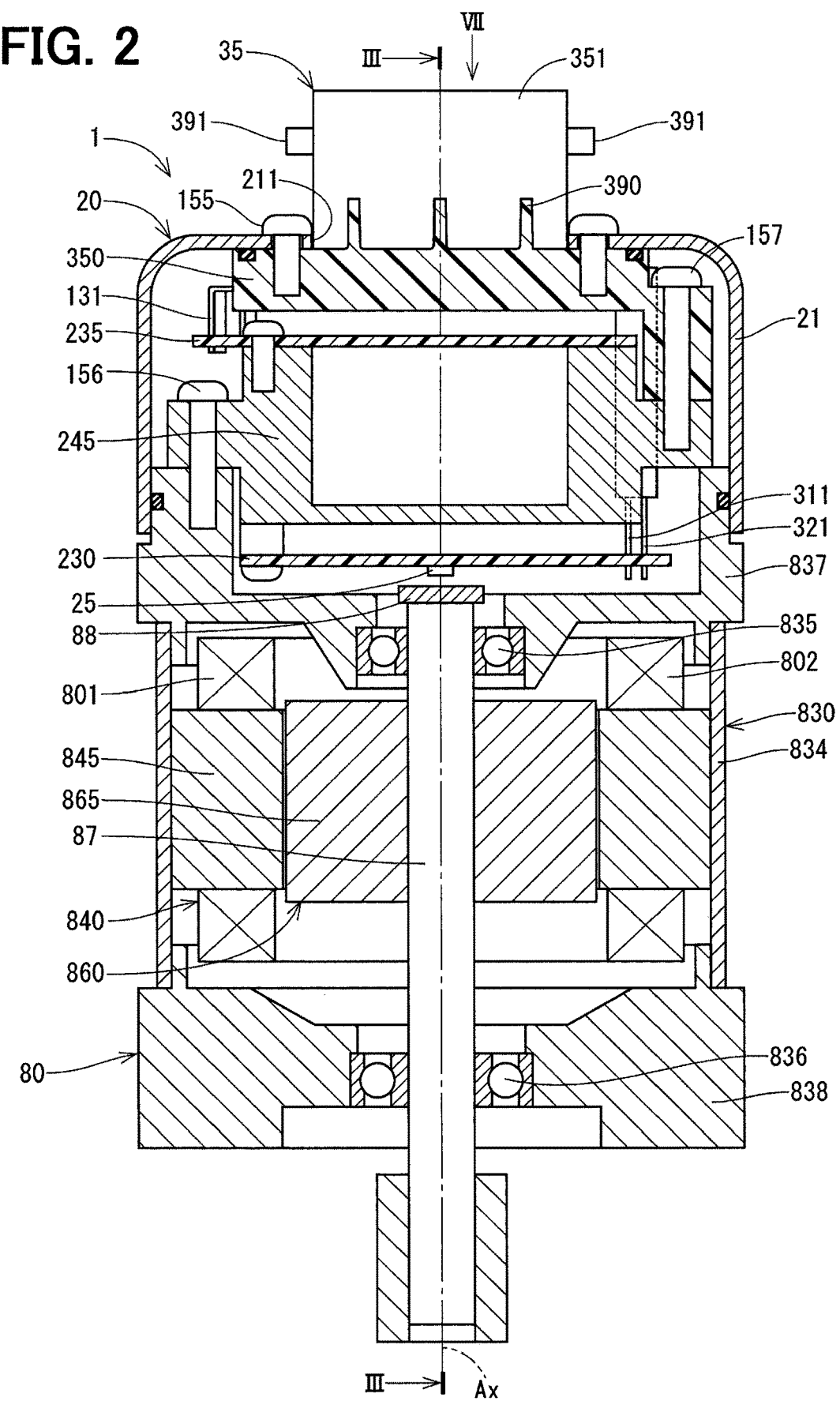
FIG. 2 is a vertical cross-sectional view of the drive device.
Figure 3:
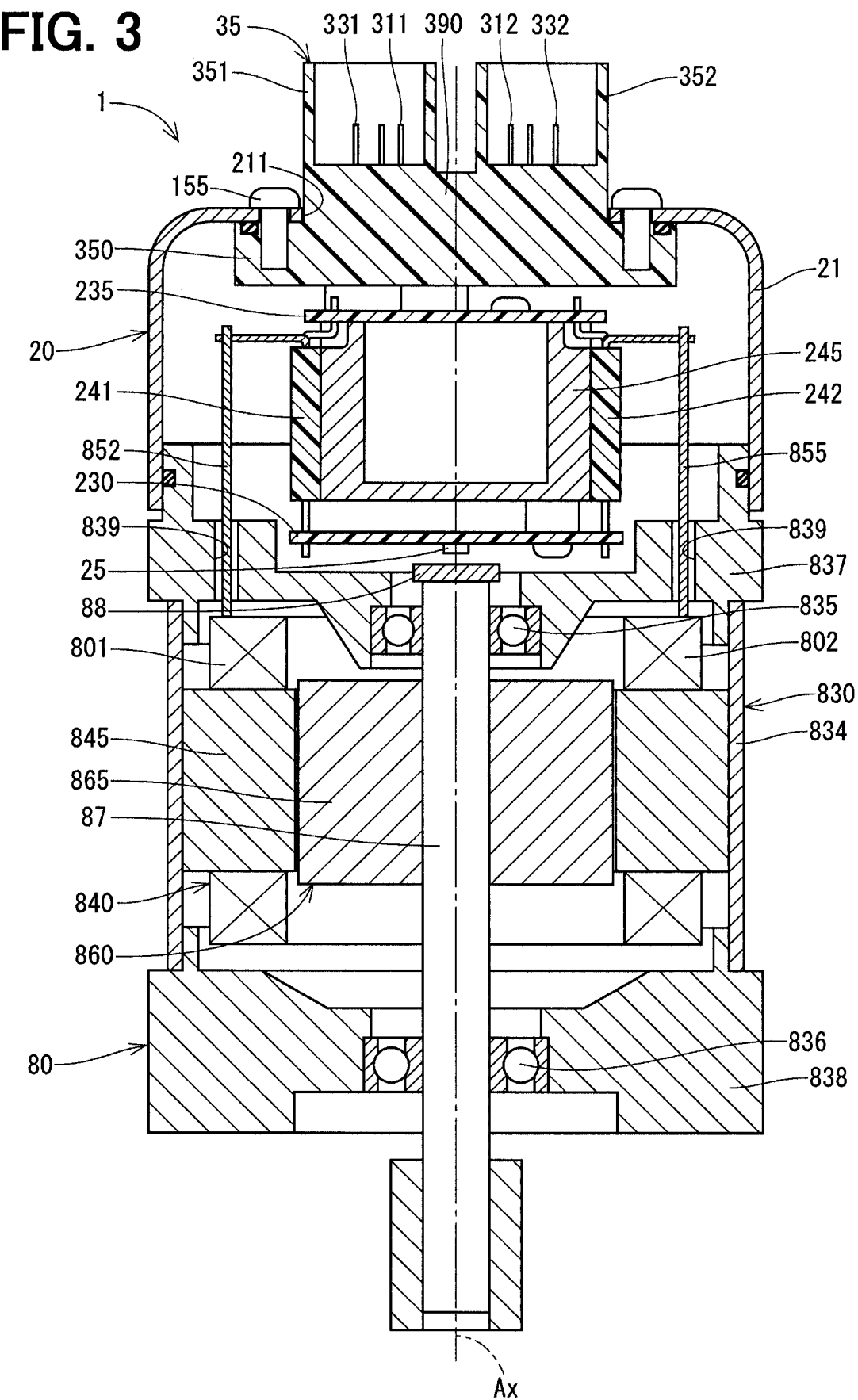
FIG. 3 is a cross-sectional view along a line III-III in FIG. 2.

With references to FIGS. 2 and 3, the motor 80 is a three-phase brushless motor that includes a stator 840 and a rotor 860 housed within a housing 830. The stator 840 has a stator core 845 fixed to the housing 830 and two sets of three-phase winding wires 801, 802 assembled to the stator core 845. Three lead wires 851, 853, 855 (shown partially in FIG. 3) are respectively connected to, and extend from, the three phases of winding wires (e.g., U-phase, V-phase, and W-phase, shown in FIG. 4) that form the first set of winding wires 801. Similarly, three lead wires 852, 854, 856 (shown partially in FIG. 3) are respectively connected to, and extend from, the three phases of the winding wires that form the second set of winding wires 802.

The rotor 860 has a shaft 87 supported by a rear bearing 835 and a front bearing 836, and a rotor core 865 into which the shaft 87 is fitted. The rotor 860 is disposed inside the stator 840 and rotates relative to the stator 840. A permanent magnet 88 is attached at one end of the shaft 87.

The housing 830 has a cylindrical case 834, a rear frame end 837 at one end of the case 834, and a front frame end 838 at the other end of the case 834. The rear frame end 837 and the front frame end 838 are fastened to each other by bolts or like fasteners (not shown). The lead wires 851-856 of each of the winding sets 801 and 802 are inserted into a lead wire insertion hole 839 in the rear frame end 837 and connected to the control unit 10.

Figure 4:
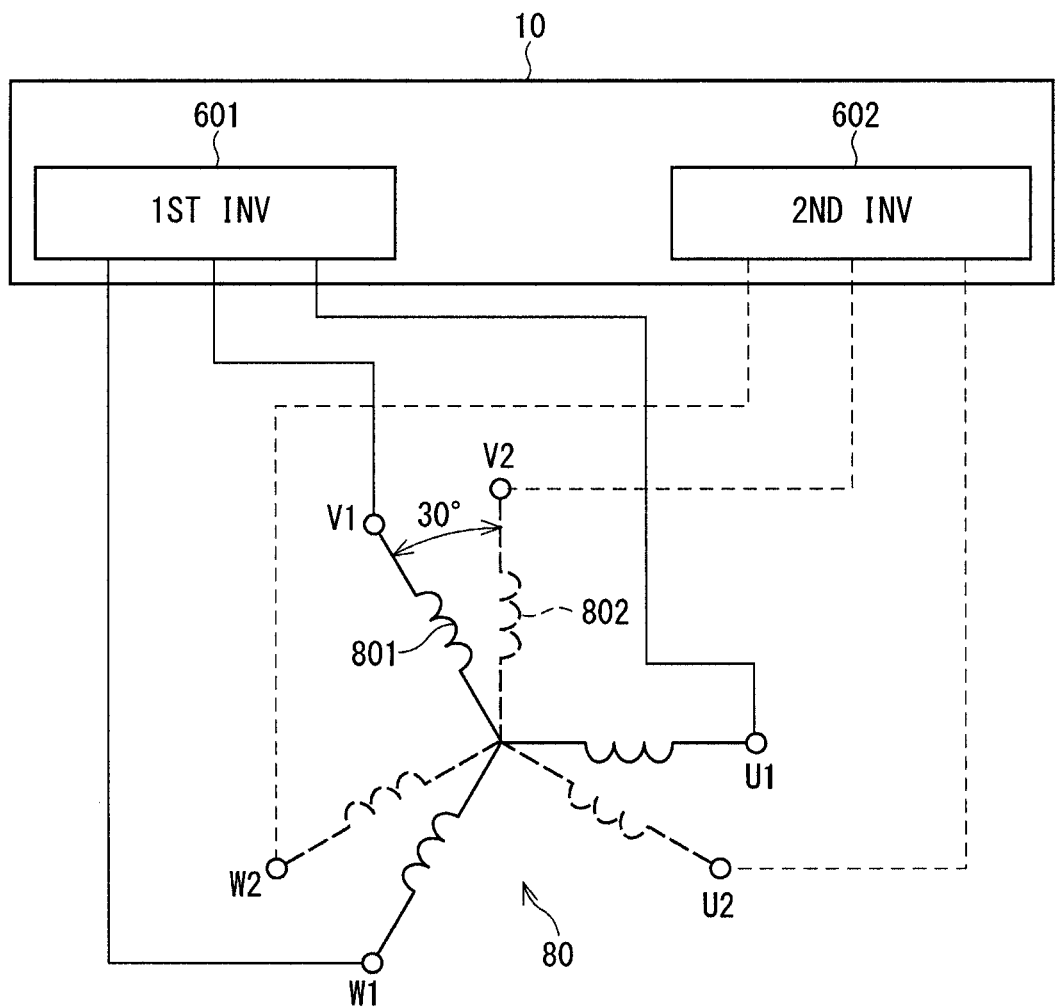
FIG. 4 is a schematic diagram of a polyphase coaxial motor.

As shown in FIG. 4, the sets of winding wires 801 and 802 are arranged at a common stator core with an electric angle of 30 degrees (i.e., shifted 30°) between wires of the same phase among the sets of winding wires 801 and 802. For example, the wire V1 corresponding to the V-phase in the first winding wire set 801 is shifted 30 degrees relative to the wire V2 corresponding to the V-phase in the second winding wire set 802.

First Embodiment

Next, the configuration of the drive device 1 of the first embodiment is described with reference to FIGS. 2 to 15. As shown in FIGS. 2 and 3, the control unit 10 includes a controller 20, a cover 21 covering the controller 20, a connector part 35 for connecting the controller 20 to the external connectors 161 and 162 on the external cables 191 and 192, as shown in FIG. 1. The cover 21 is fixed to the connector part 35 by a screw 155, and protects the control portion 20 from external impact and prevents the ingress of dust, water, and like solids/liquids into the control portion 20. The cover 21 may be fixed to the connector part 35 by a fastener other than a screw. For example, the cover 21 may be fixed to the connector part 35 by an adhesive.

The controller 20 includes a heat sink 245 fixed to the rear frame end 837, substrates 230 and 235 and power modules 241 and 242 respectively fixed to the heat sink 245, and various electronic components mounted on the substrates 230 and 235. In FIGS. 2 and 3, electronic components are not shown in the illustration. The electronic components are described later with reference to FIGS. 5 and 6. The power modules 241 and 242 have switching elements and are connected to the lead wires (e.g., 852 and 856) of the respective winding sets 801 and 802. The heat sink 245 is provided under the cover 21 on the inside of the drive device 1 at a position between the rear frame end 837 and the connector part 35, and is fixed by a screw 156. The substrate 230 is provided at a position facing the rear frame end 837. The substrate 235 is provided at a position facing the connector part 35. On the substrates 230, 235, two systems of electronic components may be independently provided for each system to realize a redundant configuration.

Figure 5:
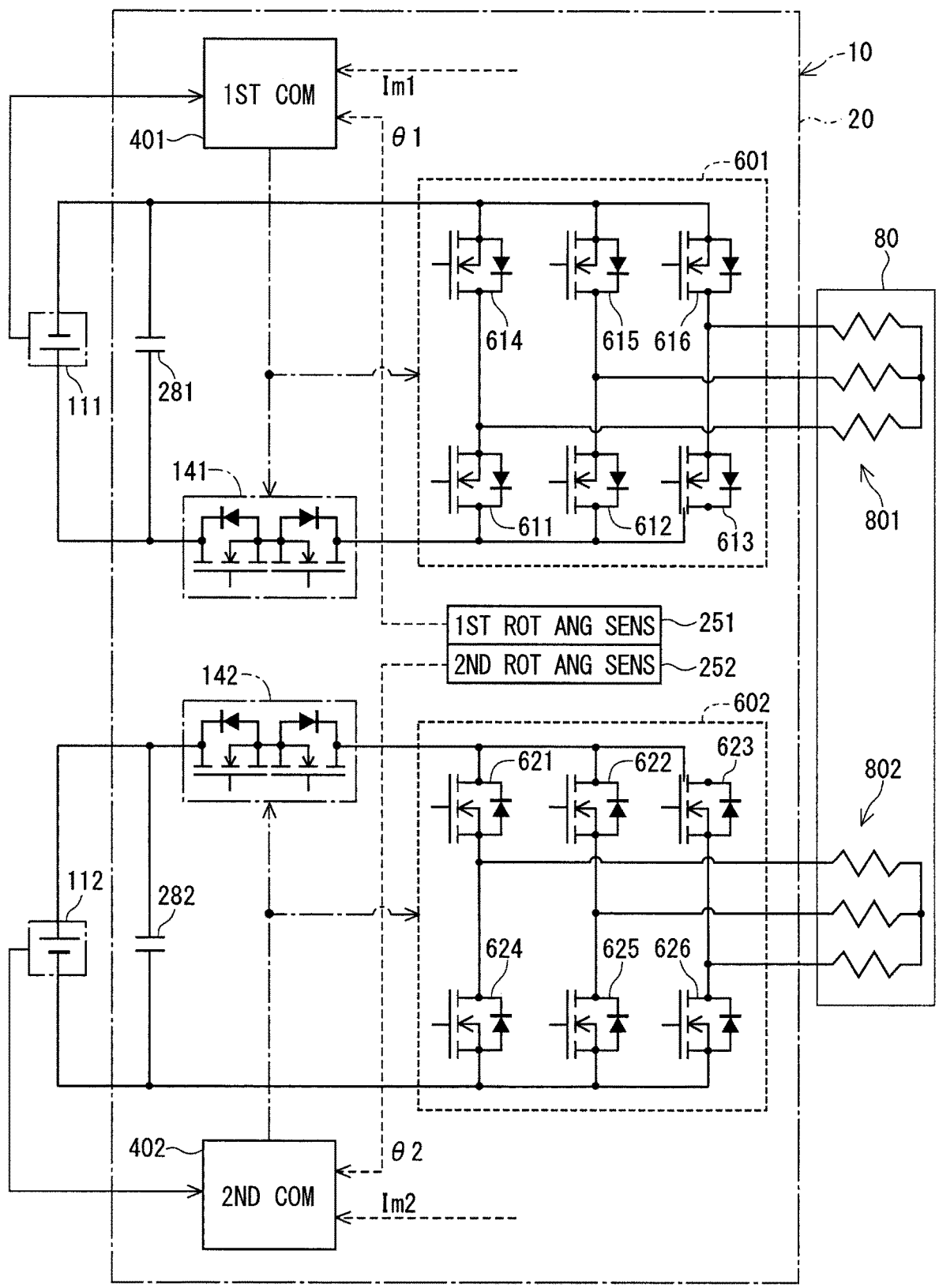
FIG. 5 is a schematic diagram of the drive device in a first embodiment of the present disclosure.

FIG. 5 shows a circuit configuration of the drive device 1. The controller 20 is a dual-system motor control device that has two inverters 601 and 602 that function as "power converters," two computers 401 and 402, and the controller 20 is connected to the two sets of winding wires 801 and 802 in the motor 80. In the dual system, the combination of the elements including the set of winding wires, the inverter, and the computer may be referred to as a "system," i.e., one set of components in the dual, redundant configuration. For example, the inverter 601, the computer 401, the winding wires 801, and the other electronic elements associated with these components may be referred to as a system.

To distinguish between the different systems in the description, "first" or "first system" may be added to the components and/or signals of the first system, and "second" or "second system" may be added to the components and/or signals of the second system. For elements common to both systems, or when describing components in general, i.e., when there is no need to distinguish between the first and second systems, the "first" and "second" identifiers may be omitted Except for switching elements, e.g., 611-616 and 621-626, "1" is added to the end of the reference characters of the components or signals used to describe the first system, and "2" is added to the end of the reference characters of the components or signals used to describe the second system.

The controller 20 includes the first and second inverters 601 and 602, the first and second power supply relays 141 and 142, the first and second rotation angle detection units 251 and 252, and the first and second computers 401 and 402. In the first embodiment, electric power is supplied to the first system from the first power source 111 and supplied to the second system from the second power source 112.

Two sets of six switching elements 611 to 616 and 621 to 626 such as metal-oxide semiconductor field-effect transistors (MOSFETs) are bridge-connected to serve respectively as the first inverter 601 and the second inverter 602. The first inverter 601 performs a switching operation according to a drive signal from the first computer 401, converts a direct current (DC) power of the first power source 111, and supplies the electric power to the first set of winding wires 801. The second inverter 602 performs a switching operation according to a drive signal from the second computer 402, converts a DC power of the second power source 112, and supplies the power to the second set of winding wires 802.

The power supply relay 141 is included on the power supply line at the input of the first inverter 601 and the power supply relay 142 is included on the power supply line at the input of the second inverter 602. The first and second power supply relays 141 and 142 shown in FIG. 5 both include a protection function that protects against a reverse connection of the power supply. The protection function in each of the power supply relays 141 and 142 is realized by a series connection of two switching elements having parasitic diodes opposite to each other. However, in place of the protection function, the power supply relays 141 and 142 may include one switching element or be provided as mechanical relays that do not include the reverse connection protection function. A capacitor 281 is included at the input sections of the first inverter 601 and a capacitor 282 is included at the input section of the second inverter 602. The capacitors 281 and 282 respectively smooth the electric power input from the first and second power supplies 111 and 112, and limit and/or prevent noise caused by the switching of the switching elements 611-616 and 621-626 in the first and second inverters 601 and 602. Each of the capacitors 281 and 282 may form a filter circuit together with an inductor (not shown) in their respective systems. That is, the first system may have a filter circuit with the first capacitor 281 and the second system may have a filter circuit with the second capacitor 282.

The first rotation angle detection unit 251 detects an electric angle θ1 of the motor 80 and outputs the electric angle θ1 to the first computer 401. The second rotation angle detection unit 252 detects an electric angle θ2 of the motor 80 and outputs the electric angle θ2 to the second computer 402. The first rotation angle detection unit 251 has a power supply line and a signal line that are separate and distinct from the power supply line and the signal line of the second rotation angle detection unit 252.

The first computer 401 calculates a drive signal for instructing the operation of the first inverter 601 based on feedback information such as the steering torque trq1, an electric current Im1, and the electric angle θ1. The second computer 402 calculates a drive signal for instructing the operation of the second inverter 602 based on feedback information such as the steering torque trq2, an electric current Im2, and the electric angle θ2.

Figure 6:
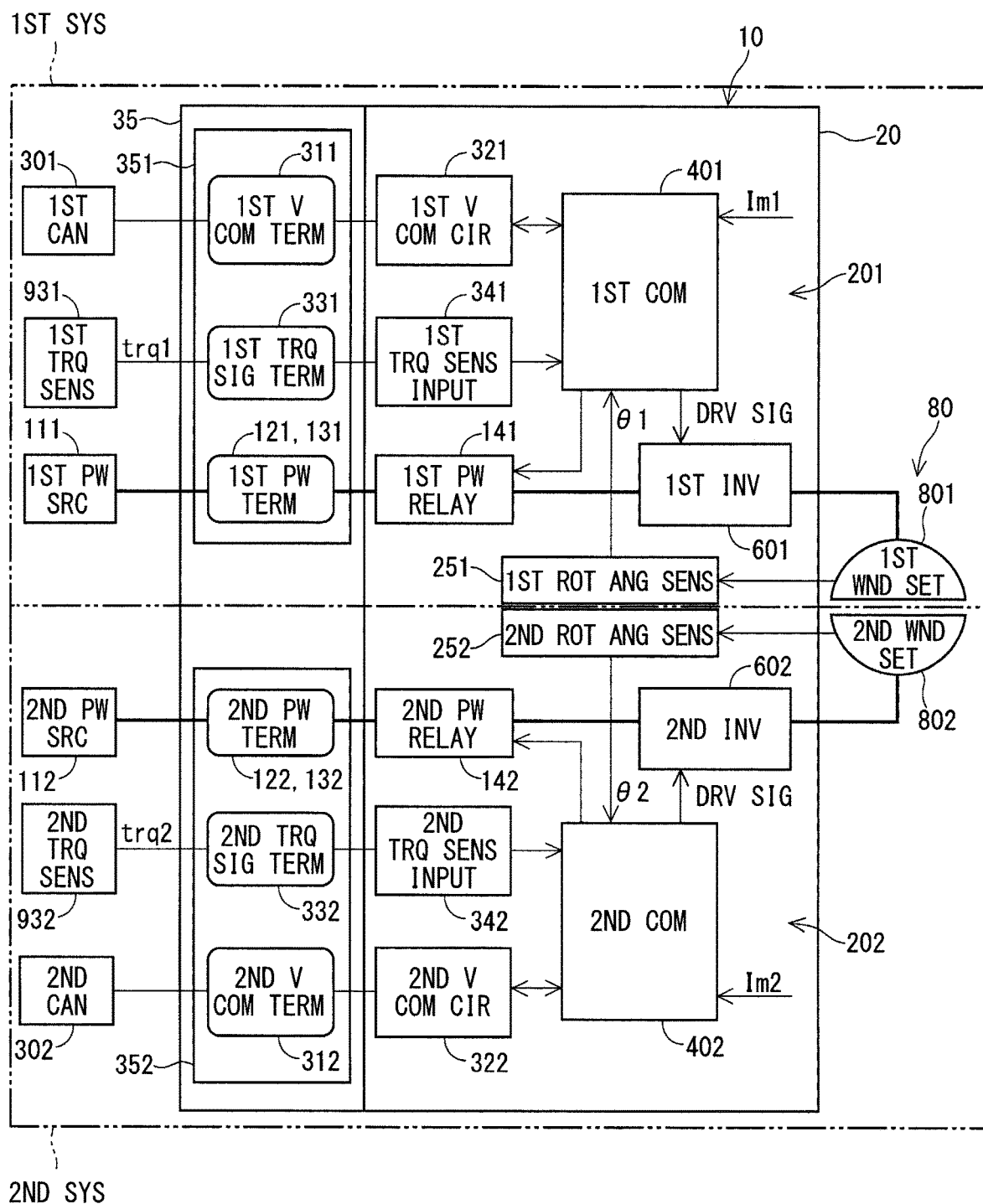
FIG. 6 is a control block diagram of the drive device in the first embodiment.

FIG. 6 shows a control configuration of the drive device 1. In FIG. 6, the first system and the second system are composed of two completely independent sets of elements, and have a redundant configuration, i.e., are configured as a "whole duplexed system."

In the controller 20, electronic components of the first system for controlling the power supply to the winding wires 801 make up a first system control unit 201, and electronic components of the second system for controlling the power supply to the winding wires 802 make up a second system control unit 202.

The connector part 35 includes a first system connector 351 having a first system terminal group connected to the first system control unit 201, and a second system connector 352 having a second system terminal group connected to the second system control unit 202.

The first system terminal includes first power supply terminals (e.g., first power supply bus bars) 121 and 131 for supplying power to the first system control unit 201, a first vehicle communication terminal 311 for inputting a signal to the first system control unit 201, and a first torque signal terminal 331. The second system terminal includes second power supply terminals (e.g., second power bus bars) 122 and 132 for supplying power to the second system control unit 202, a second vehicle communication terminal 312 for inputting a signal to the second system control unit 202, and a second torque signal terminal 332.

The first power supply terminals 121 and 131 are connected to the first power source 111. Electric power from the first power source 111 is supplied to the first set of winding wires 801 via the first power supply terminals 121 and 131, the first power supply relay 141, and the first inverter 601. Electric power from the first power source 111 is also supplied to the first computer 401 and the sensors of the first system.

The second power supply terminals 122 and 132 are connected to the second power source 112. Electric power from the second power source 112 is supplied to the second winding set 802 via the second power supply terminals 122 and 132, the second power supply relay 142, and the second inverter 602. Electric power of the second power source 112 is also supplied to the second computer 402 and the sensors of the second system.

When a Controller Area Network (CAN or CAN bus) is redundantly provided as a vehicle communication network, the first vehicle communication terminal 311 is connected at a position between a first CAN 301 and the first vehicle communication circuit 321. The second vehicle communication terminal 312 is connected at a position between a second CAN 302 and the second vehicle communication circuit 322. When a CAN is not provided redundantly, the vehicle communication terminals 311 and 312 of the two systems may be connected to the same CAN. A vehicle communication network using a communication standard other than CAN may be used. For example, a network standard such as CAN with Flexible Data rate (CAN-FD) or FlexRay may be used.

The first torque signal terminal 331 is connected at a position between the first torque sensor 931 and a first torque sensor input circuit 341. The first torque sensor input circuit 341 notifies the first computer 401 of the steering torque trq1 sent to the first torque signal terminal 331 by the first torque sensor 931. The second torque signal terminal 332 is connected at a position between the second torque sensor 932 and the second torque sensor input circuit 342. The second torque sensor input circuit 342 notifies the second computer 402 of the steering torque trq2 sent to the second torque signal terminal 332 by the second torque sensor 932.

The computers 401 and 402 can mutually transmit and receive information to and from each other by performing inter-computer communication. When an abnormality occurs in one of the two systems, the controller 20 can continue the motor control by using the normal functioning system (i.e., by using the other system that is operating normally without abnormalities).

FIGS. 2, 3, 7 to 11 show the configuration of the connector part 35. The following description assumes that the drive device 1 is cylindrical in shape. Thus, the following description may describe the geometry of the drive device 1 and the arrangement, orientation, disposition, and positioning of the elements, components and features of the drive device 1 in terms of a circle (e.g., radial distance). However, the drive device 1 is not limited to a cylindrical shape and may be a non-circular shape where accordingly, the circular descriptions may be replaced with a corresponding description based on the shape and the geometry of the drive device 1 (e.g., replacing the term "radial distance" with a "vector length from a center point to a side of the drive device" in a drive device with a rectangular shaped cross section).

Figure 9:
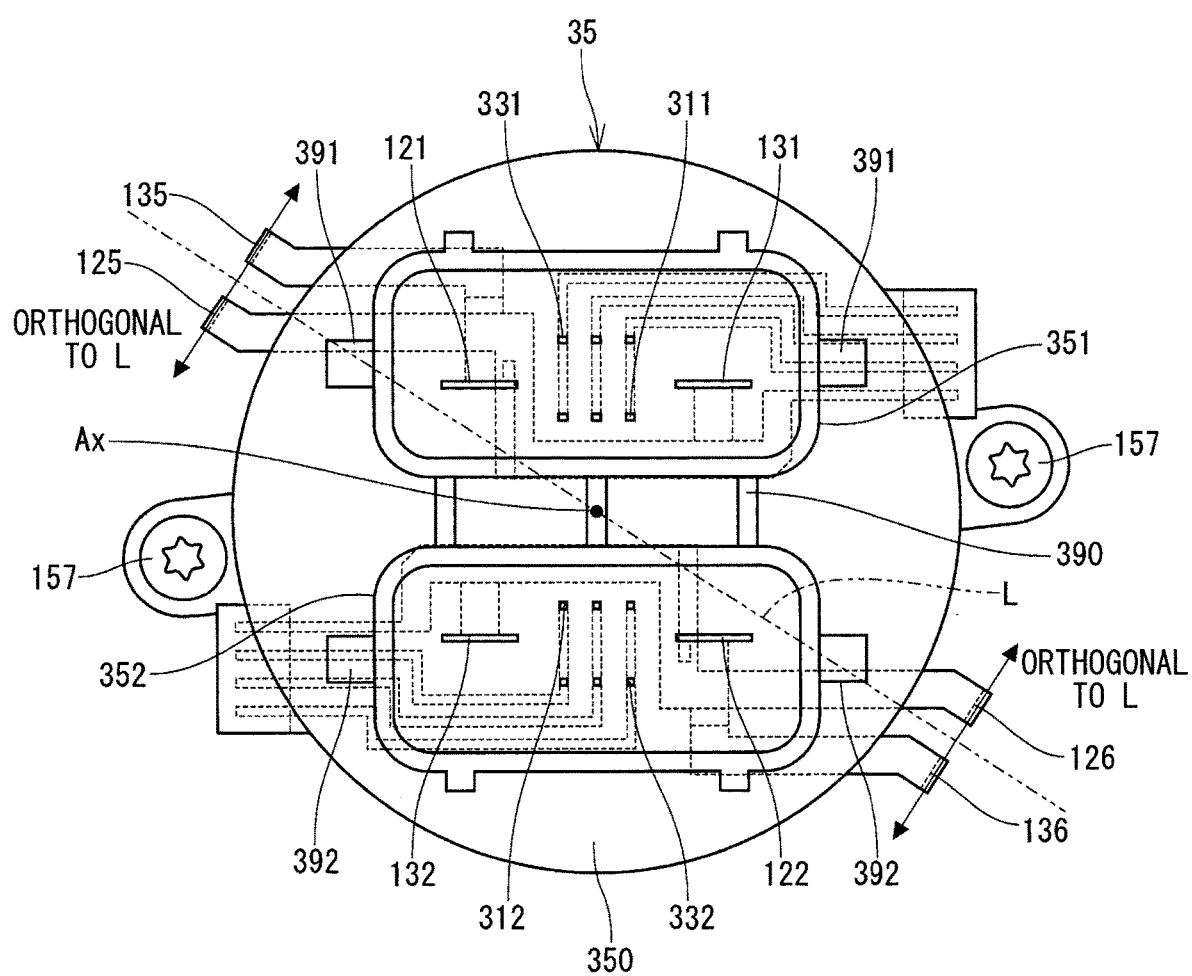
FIG. 9 is a top view of the connector in the first embodiment.
Figure 10:
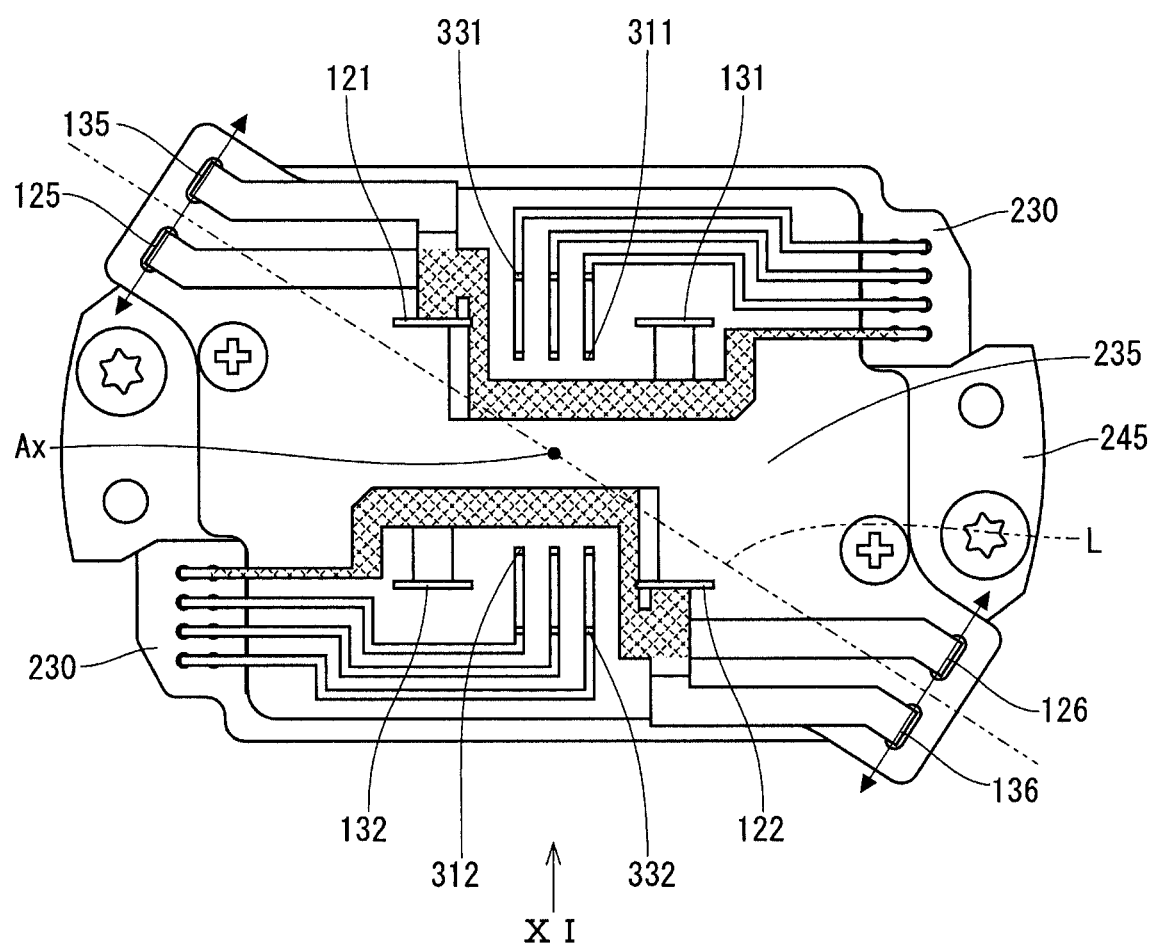
FIG. 10 is a top view of the controller in the first embodiment showing terminal groups of the connector.
Figure 11:
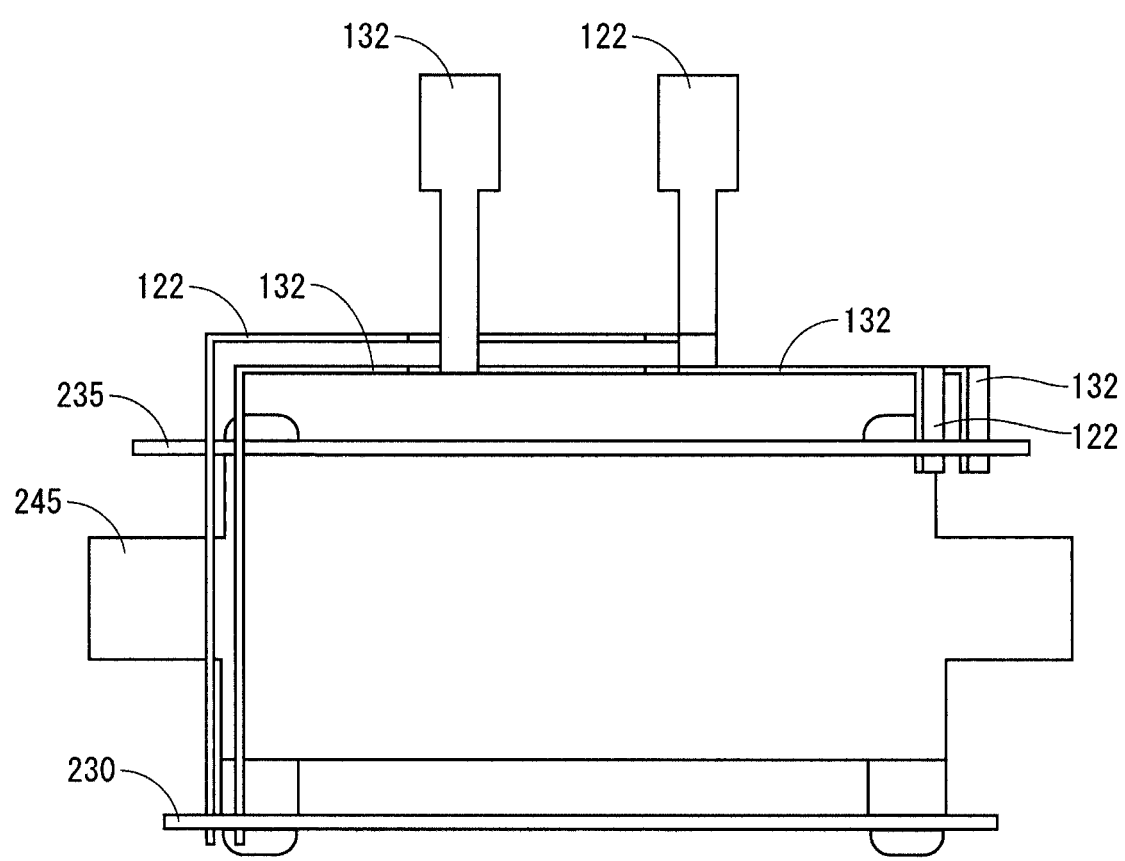
FIG. 11 is a front view of the controller and power supply terminals of the connector in the first embodiment taken along an arrow XI in FIG. 10.
Figure 12:
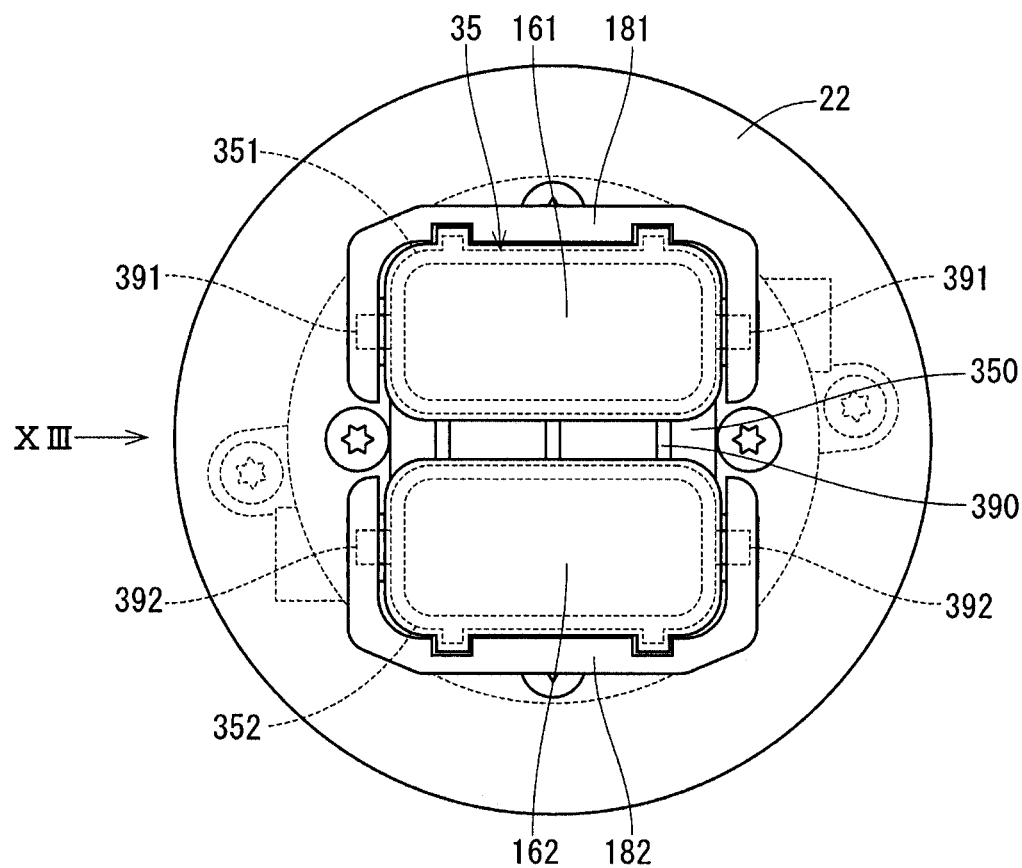
FIG. 12 is a top view of the drive device in the first embodiment with an external connector in a non-engaged state.

In FIGS. 2, 3, 9, and 10, a longitudinal axis of the motor 80 of the drive device 1 is shown as axis Ax. In FIGS. 9 and 10 showing an axial view, axis Ax is shown as a point where the longitudinal axis Ax of the motor 80 extends into and out of the drawing sheet. In FIGS. 2 and 3 showing a cross-sectional view, the axis Ax is shown as a line that extends from the top to bottom of the drawing sheet. The axis Ax is disposed centrally within the drive device 1. A direction extending orthogonally from the axis Ax may be described as a "radial direction" or "radially," and a direction running parallel to the axis Ax may be described as an "axial direction" or "axially."

As shown in FIGS. 2, 3, 7, 8, and 9, the connector part 35 includes a base portion 350, the connectors 351 and 352, the power supply terminals 131 and 132, the first and second vehicle communication terminals 311 and 312, and the first and second torque signal terminals 331 and 332. The first vehicle communication terminal 311 and the first torque signal terminal 331 may each be referred to as a "first signal terminal" (e.g., the first signal terminal 311), and the second vehicle communication terminal 312 and the second torque signal terminal 332 may each be referred to as a "second signal terminal." The base portion 350 is fixed to the heat sink 245 by a screw 157. The connectors 351 and 352 extend axially from the base portion 350 and further through an opening part 211 of the cover 21.

The first system connector 351 houses and holds the first power supply terminals 121 and 131, the first vehicle communication terminal 311, and the first torque signal terminal 331. The second system connector 352 houses and holds the second power supply terminals 122 and 132, the second vehicle communication terminal 312 and the second torque signal terminal 332. The insertion and removal (i.e., pull-out) direction of the first system connector 351 and the external connector 161 is in the axial direction, and is the same as the insertion/removal direction of the second system connector 352 and the external connector 162. The insertion/removal direction refers to the direction when inserting/pulling out (i.e., removing) the external connector into/from the connectors 351 and 352. The insertion/removal direction coincides with the direction or orientation of a mouth/face of the connectors 351 and 352. The mouth of the connector is a mouth at the tip of the connectors 351 and 352.

Figure 7:
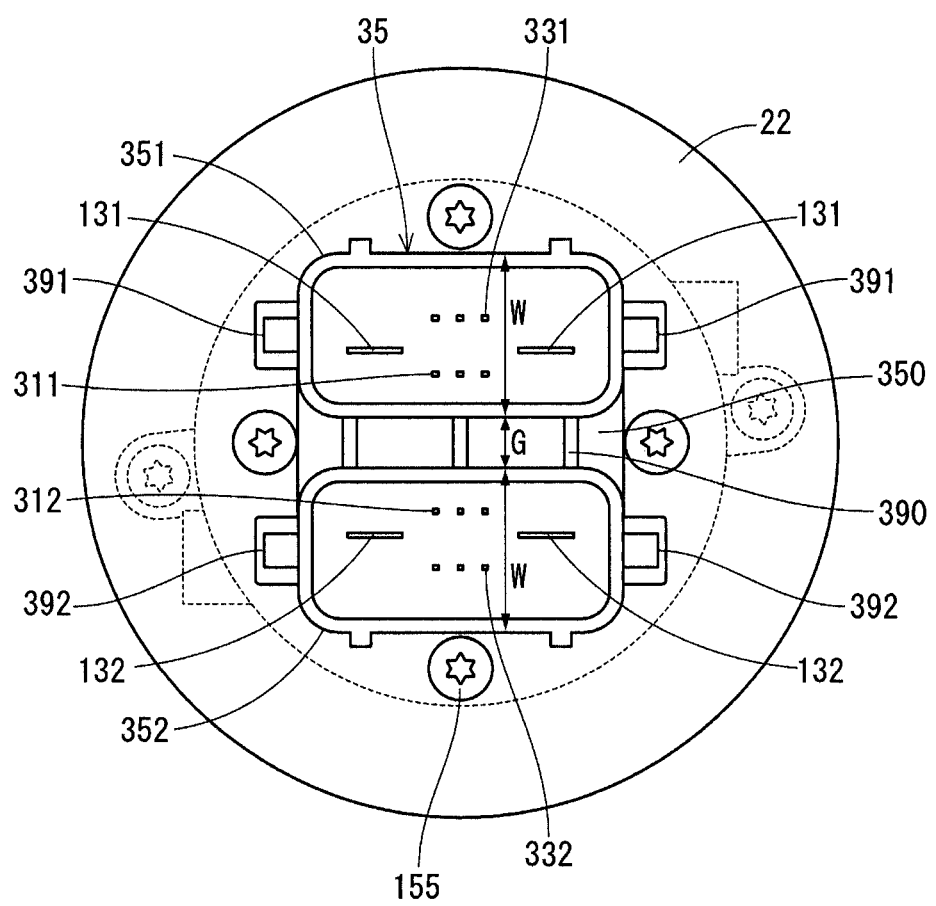
FIG. 7 is a top view of the drive device in the first embodiment taken along an arrow VII in FIG. 2.
Figure 8:
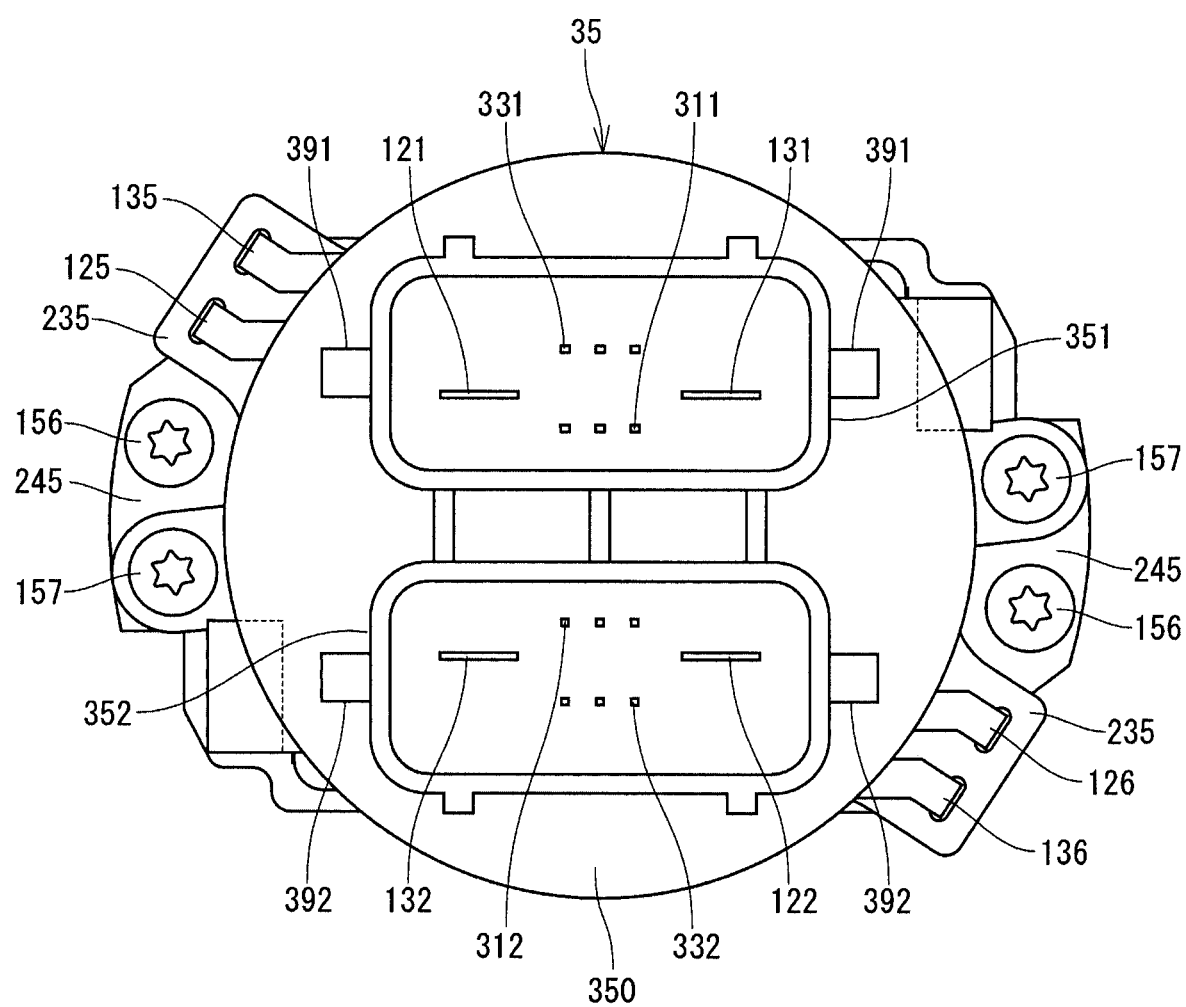
FIG. 8 is a top view of a controller and a connector in the first embodiment.

As shown in FIG. 7, the first system connector 351 and the second system connector 352 are disposed close to each other, with an interval (i.e., space) G between the two connectors 351 and 352, where the interval G is shorter than a short-side width W of both connectors. In the first embodiment, the first system connector 351 and the second system connector 352 are arranged side-by-side, with their short sides aligned in a straight line. A plurality of ribs 390 connecting the two connectors 351 and 352 are formed at a position between the first system connector 351 and the second system connector 352.

As shown in FIGS. 8 to 11, the first power supply terminal includes a first positive electrode terminal 121 and a first negative electrode terminal 131. The end portions of these power supply terminals 121 and 131 are positioned in the first system connector 351 and extend axially toward the mouth of the first system connector 351. In the base portion 350, the terminals 121 and 131 may branch/split into a plurality of branches so that one branch of each of the terminals 121 and 131 extends toward the substrate 230 while another branch extends toward the substrate 235. The second power supply terminal includes a second positive electrode terminal 122 and a second negative electrode terminal 132. The end portions of these power supply terminals 122 and 132 are positioned in the second system connector 352 and extend axially toward the mouth of the second system connector 352. In the base portion 350, the terminals 122 and 132 may branch into a plurality of branches so that one branch of each of the terminals 122 and 132 extends toward the substrate 230 while another branch extends toward the substrate 235.

In the top view of FIG. 10, where the view is taken along the axis Ax of the motor 80, the first positive electrode terminal 121 overlaps a portion of the first negative electrode 131 and the second positive electrode terminal 122 overlaps a portion of the second negative electrode 132, where the overlapping portions are indicated by crisscross hatching. The front view of FIG. 11, taken along XI in FIG. 10, shows the second positive electrode terminal 122 overlapping portions of the second negative electrode terminal 132.

The positive electrode terminals 121 and 122 and the negative electrode terminals 131 and 132 are of an electrically conductive material such as metal, and formed from stamping a flat stock such as a foil or sheet metal, and then bending the stamped metal terminals 121, 122, 131, and 132 into shape. As such, the terminals 121, 122, 131, and 132 may be planar in shape and have a rectangular-shaped cross-section, where the long side of the cross-section corresponds to the planar faces or surfaces of the terminals (e.g., front face, rear face, top surface, bottom surface), and the short side of the cross-section corresponds to the sides of the terminals. The short side of the cross-section corresponds to the thickness of the material from which the terminals are stamped. Because the terminals 121, 122, 131, and 132 are formed of a planar material and bend and branch in different directions, the drawings (e.g., FIGS. 10 and 11) may illustrate both the faces and sides of the terminals 121, 122, 131, and 132.

The positive electrodes 121 and 122 may be arranged so that their planar surfaces (i.e., faces) overlap the planar surfaces/faces of the negative electrodes 131 and 132. In the hatched overlap portions of FIG. 10, the hatching shows only the top face of the first positive electrode 121, while the underlying top face of the first negative electrode 131 is obscured from view by the positive electrode 121. Similarly, the hatching for the second positive and negative electrodes 122 and 132 only show the top face of the second positive electrode 122, which overlies and obscures the view of the top face of the second negative electrode 132.

In the first system terminal group and the second system terminal group, corresponding terminals have the same shape. For example, the first positive electrode terminal 121 and the second positive electrode terminal 122 have the same shape, and the first negative electrode terminal 131 and the second negative electrode terminal 132 have the same shape. The first system terminal group and the second system terminal group are also symmetrically arranged relative to the axis Ax. Similarly, the first system connector 351 and the second system connector 352 are symmetrical to one another about the axis Ax.

As shown in FIGS. 9 and 10, a substrate connection end 125 of the first positive electrode terminal 121 and a substrate connection end 135 of the first negative electrode terminal 131 are arranged side by side on either side of the virtual line L that passes through the axis Ax. The substrate connection ends 125 and 135 are arranged along a straight line that is orthogonal to the virtual line L. Similarly, a substrate connection end 126 of the second positive electrode terminal 122 and a substrate connection end 136 of the second negative electrode terminal 132 are arranged side by side on either side of the virtual line L, where the substrate connections 126 and 136 are arranged along a straight line that is perpendicular to the virtual line L. In the first embodiment, the substrate connection end 125 and the substrate connection end 135 are arranged side by side on a line tangential to a circle centered on the axis Ax, and the substrate connection ends 126 and 136 are arranged side by side on a line tangential to the same circle centered on the axis Ax.

In the first embodiment, the connectors 351 and 352 and the mouths of the connectors have a rectangular shape. That is, each of the connectors 351 and 352 has a pair of long sides and a pair of short sides.

As shown in FIGS. 2 and 7, the connectors 351 and 352 have protrusions or bosses 391 and 392 protruding radially from the short sides of the connectors 351 and 352.

That is, the protrusions 391 and 392 do not protrude from the long sides of the connectors 351 and 352, such as in the gap between the connectors 351 and 352.

As shown in FIGS. 12 to 15, the external connectors 161 and 162 are fitted to the mouth of the connectors 351 and 352. The external connectors 161 and 162 respectively include rotating levers 181 and 182 that rotate around and pivot about the protrusions 391 and 392. The external connectors 161 and 162 have cutout grooves 175 and 176 for avoiding interference with the protrusions 391 and 392 when the external connectors 161 and 162 are inserted into the connectors 351 and 352. The levers 181 and 182 include engagement grooves 185 and 186. The orientation of the grooves 185 and 186 can change depending on the orientation of the levers 181 and 182, such that the engagement grooves 185 and 186 allow the external connectors 161 and 162 to connect to the connectors 351 and 352 without interfering with the protrusions 391 and 392. The levers 181 and 182 can then be rotated after the external connectors 161 and 162 connect to the connectors 351 and 352 to change the orientation of the engagement grooves 185 and 186. As such, the engagement grooves 185 and 186 can be rotated to engage the protrusions 391 and 392 after the external connectors 161 and 162 are connected to the connectors 351 and 352. When performing the installation of the drive device 1 in a vehicle, a worker can press the levers 181 and 182 to initially insert the external connectors 161 and 162 into the mouth of the connectors 351 and 352. As the levers 181 and 182 are pressed, the levers begin to rotate. That is, as the levers 181 and 182 rotate from the position shown in FIG. 12 to the position shown in FIG. 14, the external connectors 161 and 162 move in the insertion direction. When the levers 181 and 182 are rotated to the position shown in FIG. 14, the engagement grooves 185 and 186 are rotated to a position that is perpendicular to the insertion/removal direction, to prevent the external connectors 161 and 162 from falling off or disengaging from the connectors 351 and 352. Claws (not shown) may be provided on the external connectors 161 and 162, together with holes (not shown) on the levers 181 and 182 to lock the levers 181 and 182 after rotating to the position shown in FIG. 14. When the levers 181 and 182 rotate from the position shown in FIG. 13 to the position shown in FIG. 15, the engagement grooves 185 and 186 engage with the protrusions 391 and 392. The protrusions 391 and 392 limit the travel of the levers 181 and 182 of the external connectors 161 and 162 and may be used to lock the levers 181 and 182.

Figure 13:
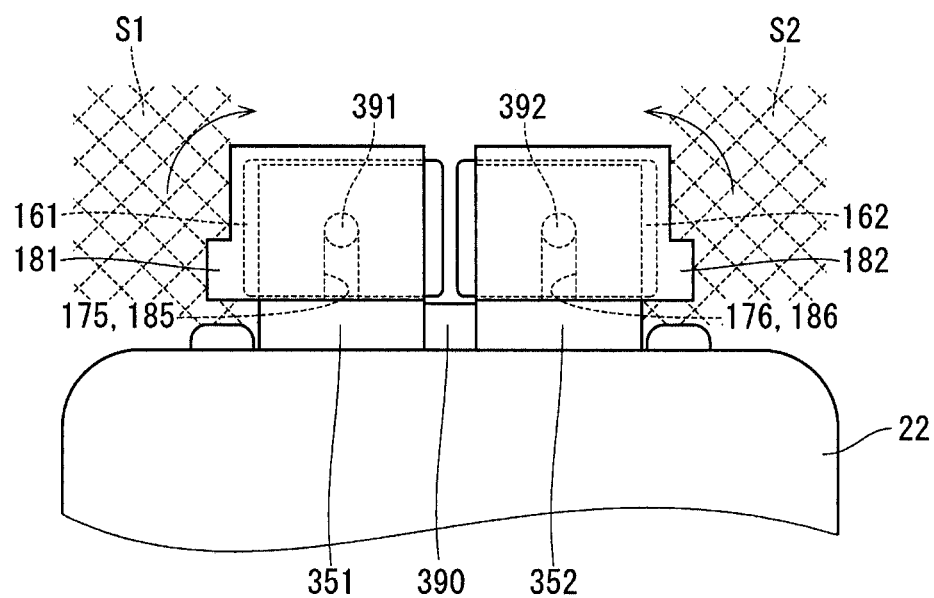
FIG. 13 is a side view of the drive device in the first embodiment with the external connector in the non-engaged state taken along an arrow XIII in FIG. 12.
Figure 14:
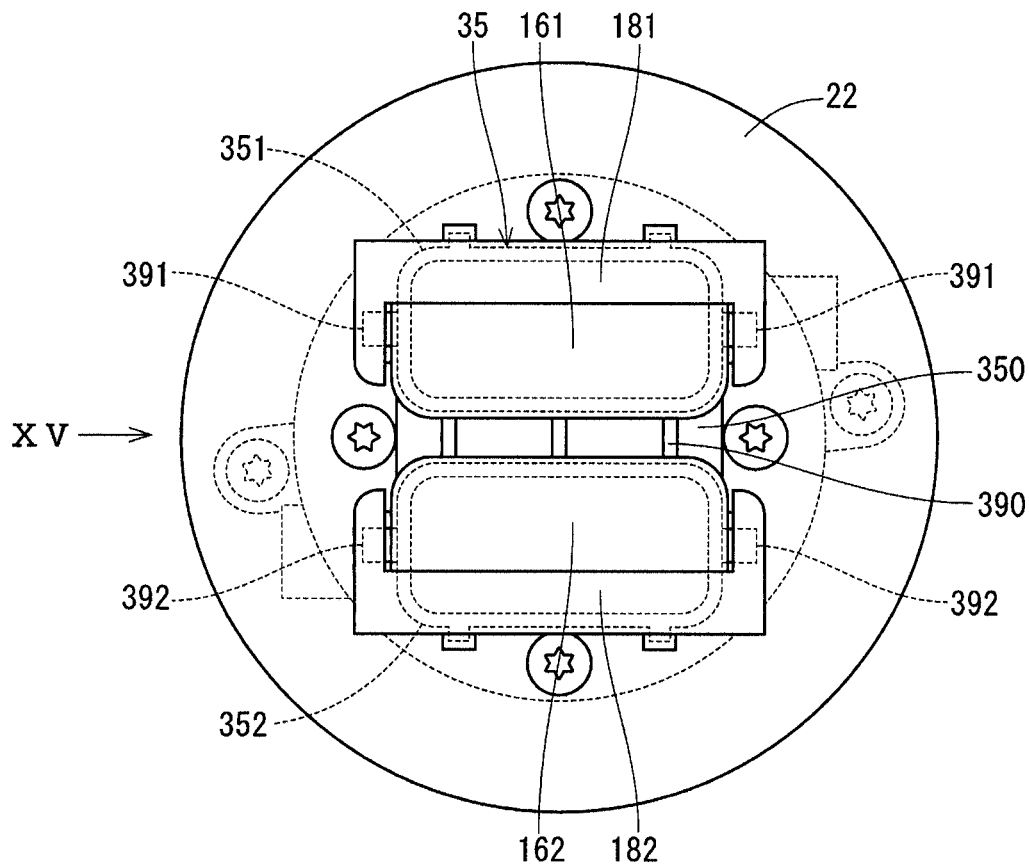
FIG. 14 is a top view of the drive device in the first embodiment with the external connector in a locked/engaged state.
Figure 15:
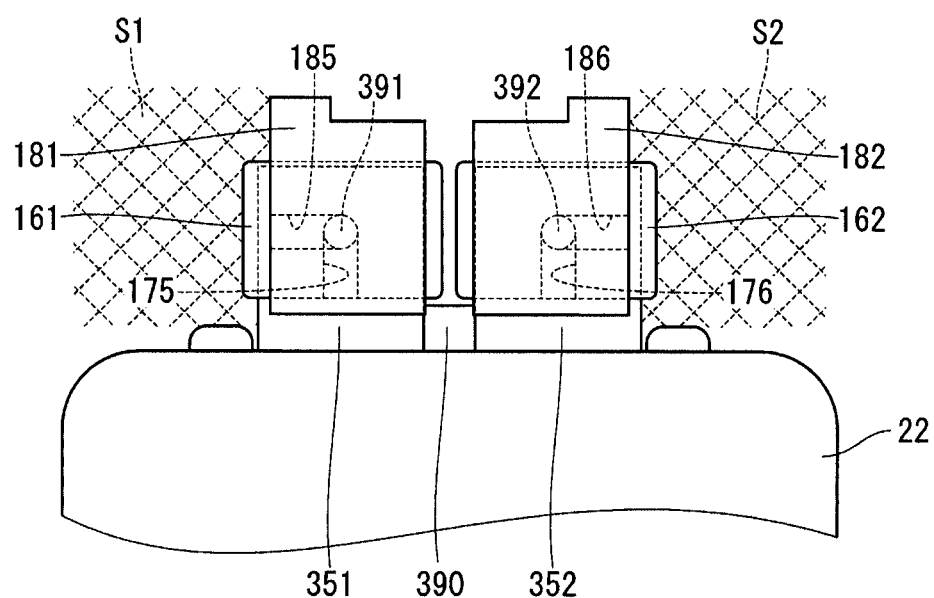
FIG. 15 is a side view of the drive device in the first embodiment with the external connector in a locked/engaged state taken along an arrow XV in FIG. 14.

As shown in FIGS. 13 and 15, a space 51 is included on one side of the connector 351 to allow the first lever 181 to rotate to engage and disengage the protrusion 391 of the first system connector 351 (i.e., to switch between an engaged state in FIG. 15 and a disengaged state in FIG. 13). Similarly, a space S2 is included on one side of the connector 352 to allow the second lever 182 to rotate to engage and disengage the protrusion 392 of the second system connector 352. In other words, the first lever 181 used to engage the boss 191 of the first system connector 351 is arranged to have an interference-free operation space 51 thereabout for moving/switching the lever 181 between an engagement and disengagement state relative to the boss 191. Similarly, the second lever 182 used to engage the boss 192 of the first system connector 352 is arranged to have an interference-free operation space S2 thereabout for moving/switching the lever 182 between an engagement and disengagement state relative to the boss 192. The interference-free space 51 of the first lever 181 and the interference-free space S2 of the second lever 182 are mutually opposite to each other in terms of the arrangement positions of the first lever 181 and the second lever 182.

(Effects)

As described in the first embodiment above, the connector part 35 includes the first positive electrode terminal 121 and the first negative electrode terminal 131 for supplying power to the first system control unit 201, and the second positive electrode terminal 122 and the second negative electrode terminal 132 for supplying electric power to the second system control unit 202. A portion of a planar face of the first positive electrode terminal 121 is arranged to overlap a portion of the planar face of the first negative electrode terminal 131. Similarly, a portion of the planar face of the second positive electrode terminal 122 overlaps a portion of the planar face on the second negative electrode terminal 132.

By arranging the faces/surfaces of the positive electrode terminals 121 and 122 and the negative electrode terminals 131 and 132 to overlap with each other, as described above, the power supply terminals can be easily arranged and rearranged depending on the configuration of the drive device 1. For example, if other connectors are included in addition to connectors 351 and 352, the drive device 1 can easily be reconfigured to accommodate additional connectors without increasing the overall size (e.g., diameter) of the drive device 1. The advantageous effects of such an arrangement can be applied to a drive device having a one system configuration. In other words, by using the overlapping arrangement of the current embodiment, multiple connectors and multiple systems can be accommodated within a drive device 1 intended to house only one system/connector, without needing to increase the diameter of the drive device 1 to house the additional systems and accommodate the additional connectors. In addition, by using such an arrangement of the positive electrode terminals and the negative electrode terminals, the loop area of the power supply line can be better limited in size and/or prevented from increasing in size. Consequently, the above-described overlapping arrangement of the face surfaces of the positive electrode terminals and the negative electrode terminals not only limits and/or prevent increases in the overall size (i.e., diameter) of the drive device 1, but also limits and/or prevents noise generation by limiting increases to the loop size of the power supply line.

The positive electrode terminals 121 and 122 and the negative electrode terminals 131 and 132 each has a rectangular-shaped cross-section where the cross-section includes long sides and short sides of the rectangle. The first positive electrode terminal 121 and the first negative electrode terminal 131 are arranged so that the long sides of their cross-sections overlap with each other. The second positive electrode terminal 122 and the second negative electrode terminal 132 are arranged so that the long sides of their cross-sections overlap with each other. By positioning the positive electrode terminals 121 and 122 and the negative electrode terminals 131 and 132 so that their long sides overlap with each other, a more effective reduction in noise can be realized.

The first positive electrode terminal 121 and the second positive electrode terminal 122 have the same shape. Further, the first negative electrode terminal 131 and the second negative electrode terminal 132 have the same shape. As such, cost reductions may be realized by using multiple components with the same shape.

The first system terminal group and the second system terminal group are symmetrically arranged with respect to the axis Ax. As such, the footprint or silhouette of the drive device 1 can be made smaller to reduce the overall volume of the drive device 1 by using such an arrangement of the terminals.

The first system connector 351 and the second system connector 352 are symmetrically arranged about the axis Ax. As such, the footprint/silhouette of the drive device 1 can be made smaller to reduce the volume of the drive device 1 by using such an arrangement of the terminals.

The insertion and removal directions of the first system connector 351 and the second system connector 352 are in the same, axial direction as the longitudinal axis Ax of the drive device 1/motor 80. The first system connector 351 and the second system connector 352 are arranged such that the short sides of the connectors/connector mouths are aligned on a straight line, and the length of the gap/space G between the connectors is smaller than the short side width W of the connectors to position the connectors 351 and 352 close to one another. The connectors 351 and 352 have the protrusions 391 and 392 protruding from the short sides of the connectors 351 and 352.

That is, the protrusions 391 and 392 do not protrude from the long sides of the connectors 351 and 352 and are not formed in the gap between the connectors. In such arrangement, the protrusions 391 and 392 are spaced apart from each other, so that the connectors 351 and 352 can be moved closer to one another. Thus, the space surrounding a connector for connecting the connector (i.e., installation space) can be reduced, which in turn reduces the overall body size/volume of the drive device 1. Since the protrusions 391 and 392 are separated from each other and moved to the short sides of the connectors 351 and 352, such an arrangement of the protrusions 391 and 392 frees up space on one of the long sides of the connectors 351 and 352 for operating the levers 181 and 182.

The arrangement of the connectors 351 and 352 may realize additional space savings to create a space 51 on one of the long sides of the connector 351 for operating the first lever 181 and to create a space S2 on one of the long sides of the connector 352 for operating the second lever 182. Such an arrangement of the connectors 351 and 352 improves the workspace around the connectors 351 and 352 to improve and ease the connection of the external connectors 161 and 162 to the connectors 351 and 352. Such an arrangement of the connectors 351 and 352 can further reduce the overall size/volume of the drive device 1 in an external connector-connected state (i.e., reduce the overall size of the drive device 1 when the external connectors 161 and 162 are connected to the connectors 351 and 352).

One or more ribs 390 are formed in the space between the first system connector 351 and the second system connector 352 and extend between the long sides of the connectors 351 and 352 to connect the connectors. By using such rib structure 390, the strength of the connector part 35 can be improved to limit deformations of the connectors 351 and 352. The arrangement and position of the ribs 390 also eliminate a need for additional rib structures (e.g., on the other long side of the connectors 351 and 352), which realizes additional volume reductions to the drive device 1.

The substrate connection end 125 of the first positive electrode terminal 121 and the substrate connection end 135 of the first negative electrode terminal 131 are arranged along a line that is perpendicular to the virtual line L passing through the axis Ax. Similarly, the substrate connection end 126 of the first positive electrode terminal 122 and the substrate connection end 136 of the second negative electrode terminal 132 are arranged along a line that is perpendicular to the virtual line L passing through the axis Ax in the axial view. By using such an arrangement, the power supply terminals 121 and 131 of the first system and the power supply terminals 122 and 132 of the second system can be connected to the substrate 235 in a single manufacturing process (i.e., in a single manufacturing step). As such, such an arrangement can reduce the overall manufacturing time of the drive device 1 to realize additional cost savings by using a more effective manufacturing process.

Second Embodiment

Figure 16:
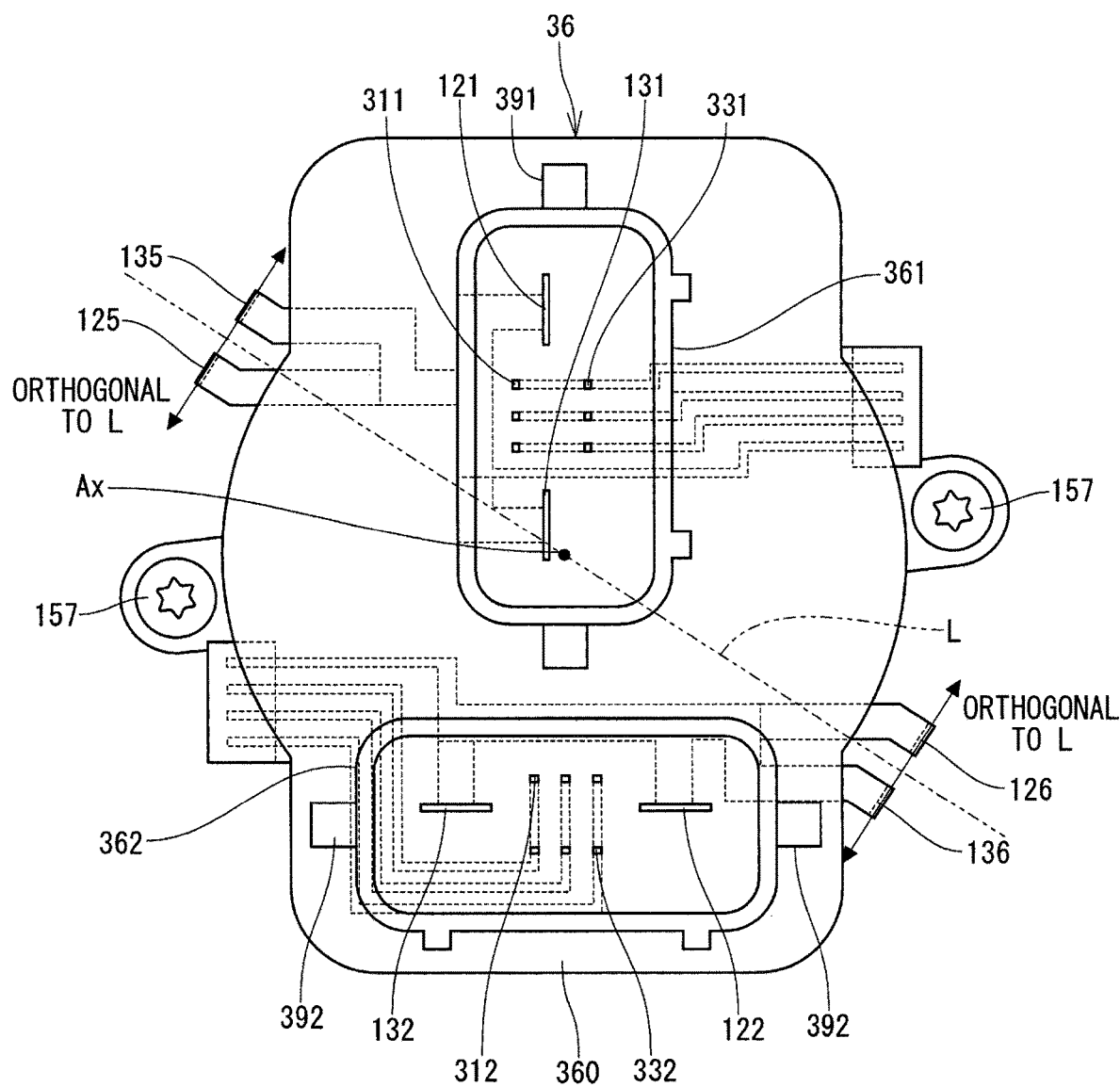
FIG. 16 is a top view of a connector in a second embodiment of the present disclosure.
Figure 17:
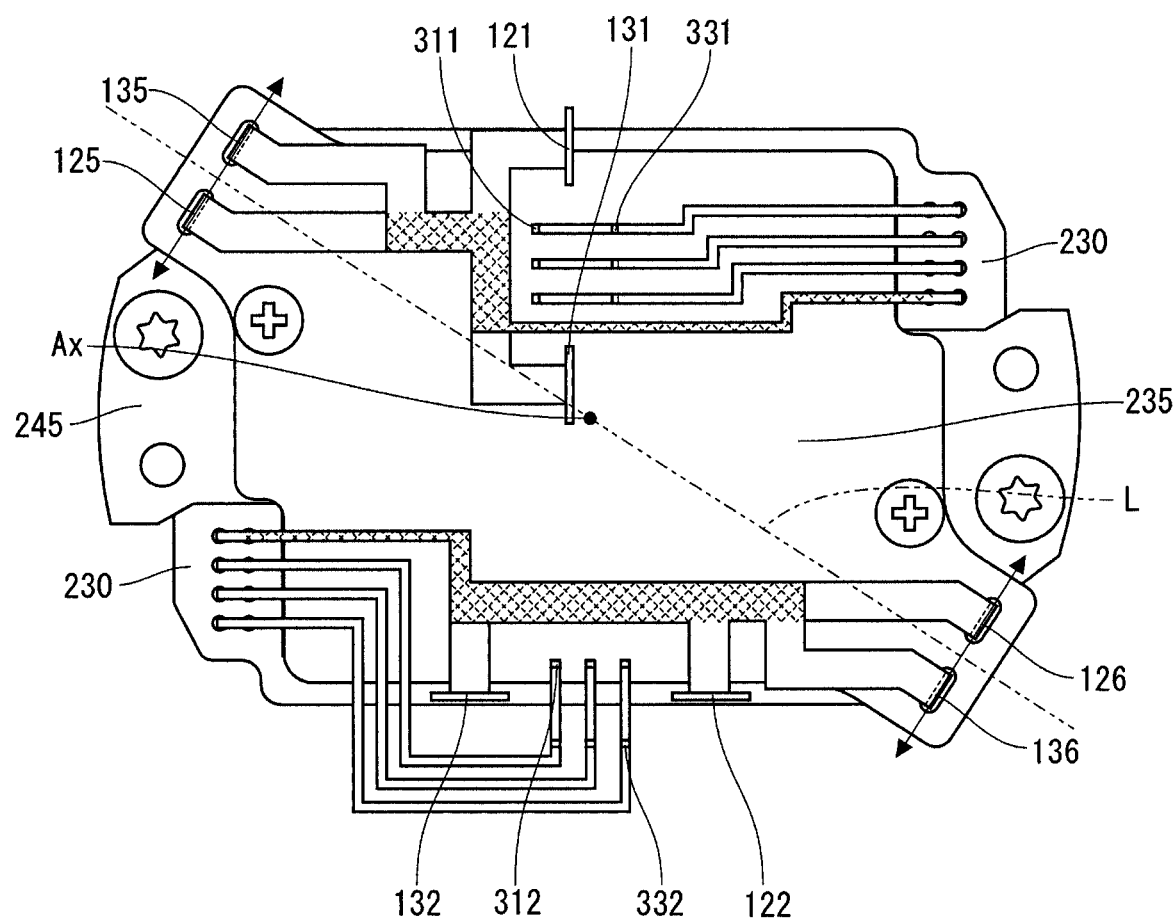
FIG. 17 is a top view of the controller in the second embodiment showing terminal groups.

The second embodiment is shown in FIGS. 16 and 17. In FIG. 16, one of the connectors 361 and 362 is rotated 90 degrees relative to the other such that the short sides of the first system connector 361 are parallel to the long sides of the second system connector 362. In this arrangement, the first system terminal group and the second system terminal group are not arranged symmetrically with respect to the axis Ax. In other words, the first system terminal group and the second system terminal group need not be arranged symmetrically, and the first system connector 361 and the second system connector 362 need not be arranged symmetrically. Except for the arrangement of the connectors 361 and 362, the second embodiment has a similar configuration as that of the first embodiment, and can achieve the same advantageous effects as those realized by first embodiment.

Third Embodiment

Figure 18:
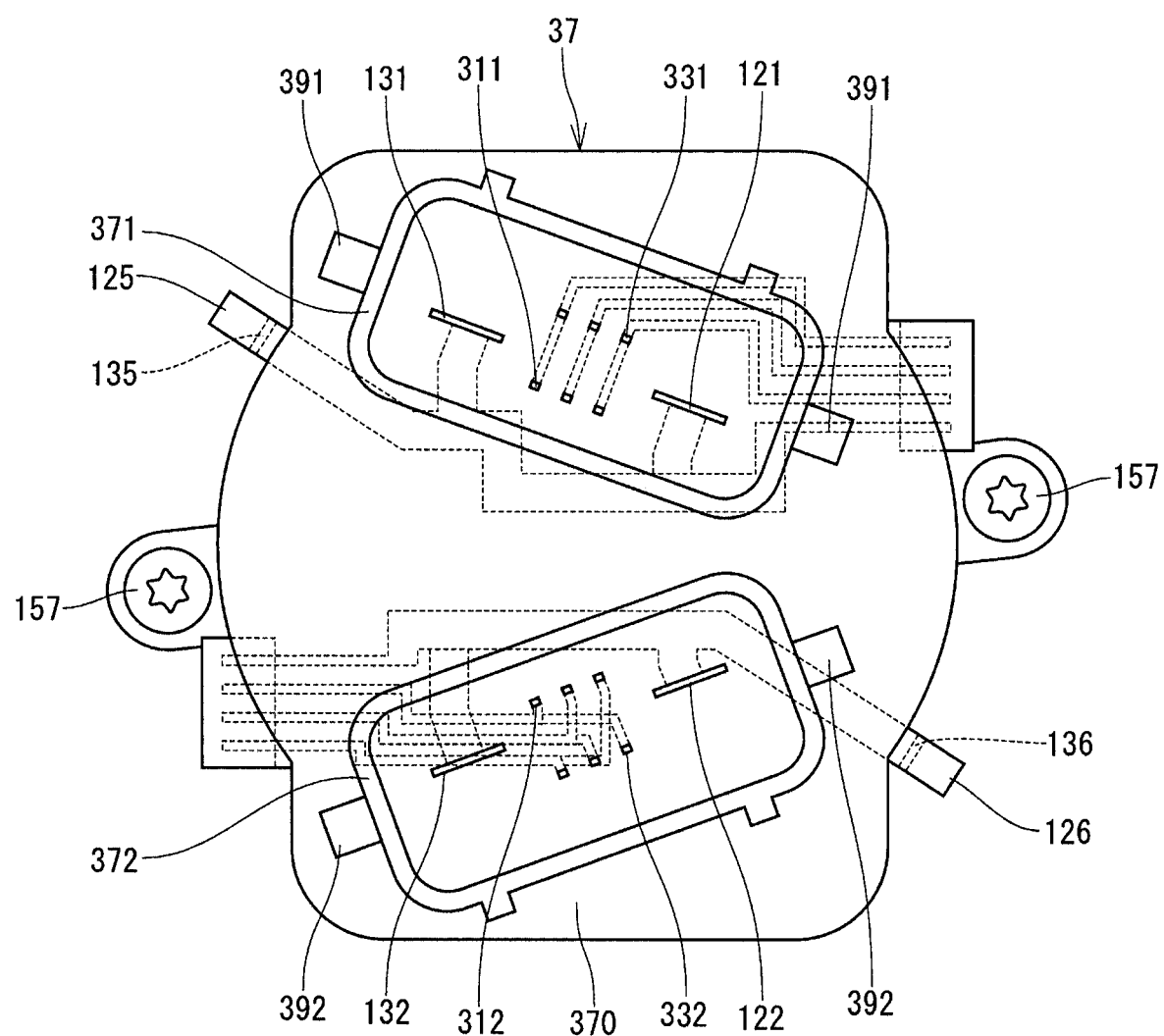
FIG. 18 is a top view of a connector in a third embodiment of the present disclosure.
Figure 19:
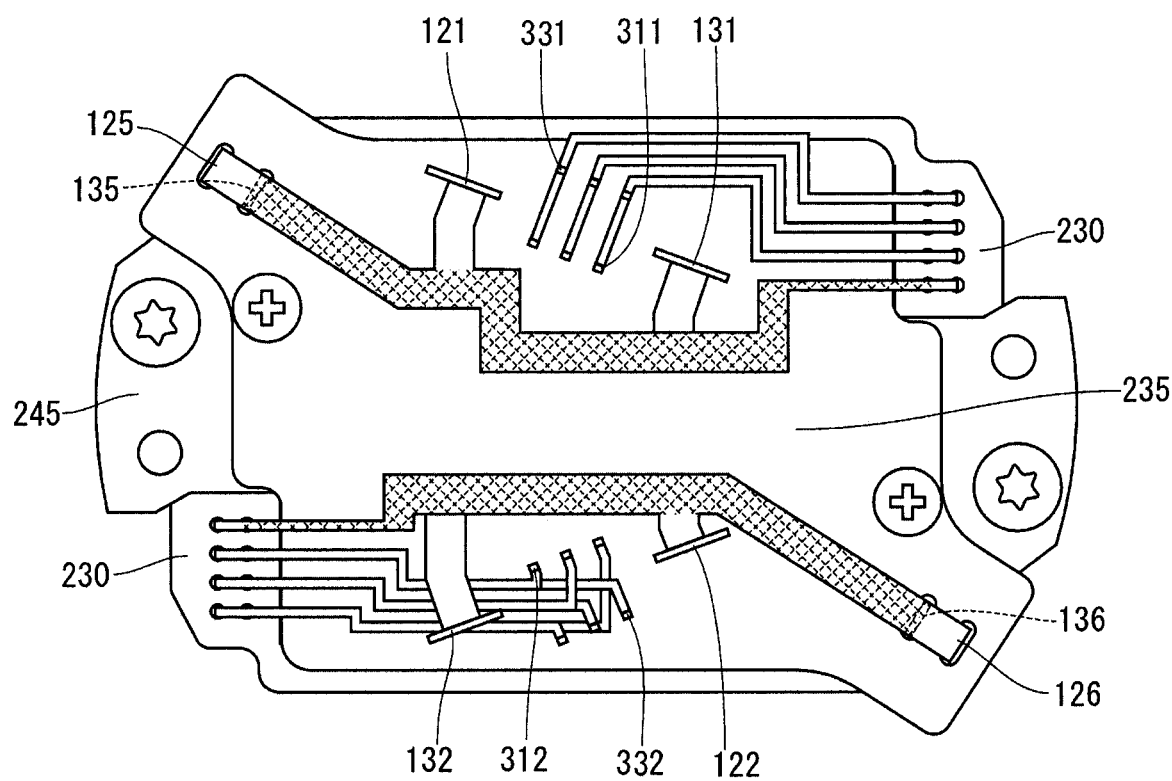
FIG. 19 is a top view of the controller in the third embodiment showing terminal groups of the connector.

The third embodiment is shown in FIGS. 18 and 19. In FIG. 18, the connectors 371 and 372 of a connector part 37 are arranged such that a first system connector 371 and a second system connector 372 are angled relative to one another at a predetermined angle. In such an arrangement, the first system terminal group and the second system terminal group are not arranged symmetrically with respect to the axis Ax. In other words, the first system terminal group and the second system terminal group need not be arranged symmetrically, and the first system connector 371 and the second system connector 372 need not be arranged symmetrically. Except for the arrangement of the connectors 371 and 372, the third embodiment is configured similar to the configuration of the first embodiment, and can achieve the same advantageous effects as those realized by the first embodiment.

Fourth Embodiment

Figure 20:
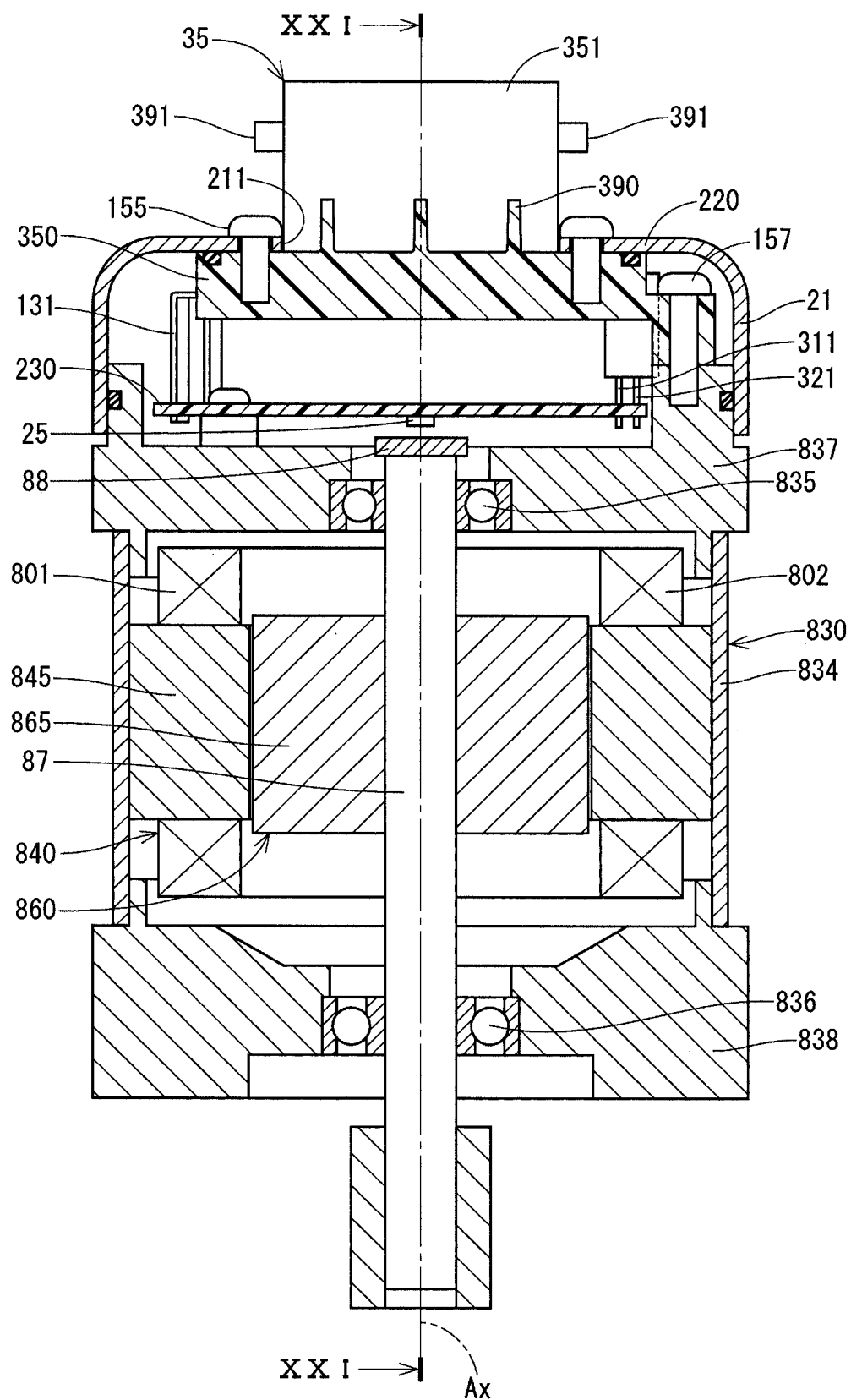
FIG. 20 is a vertical cross-sectional view of the drive device in a fourth embodiment of the present disclosure.
Figure 21:
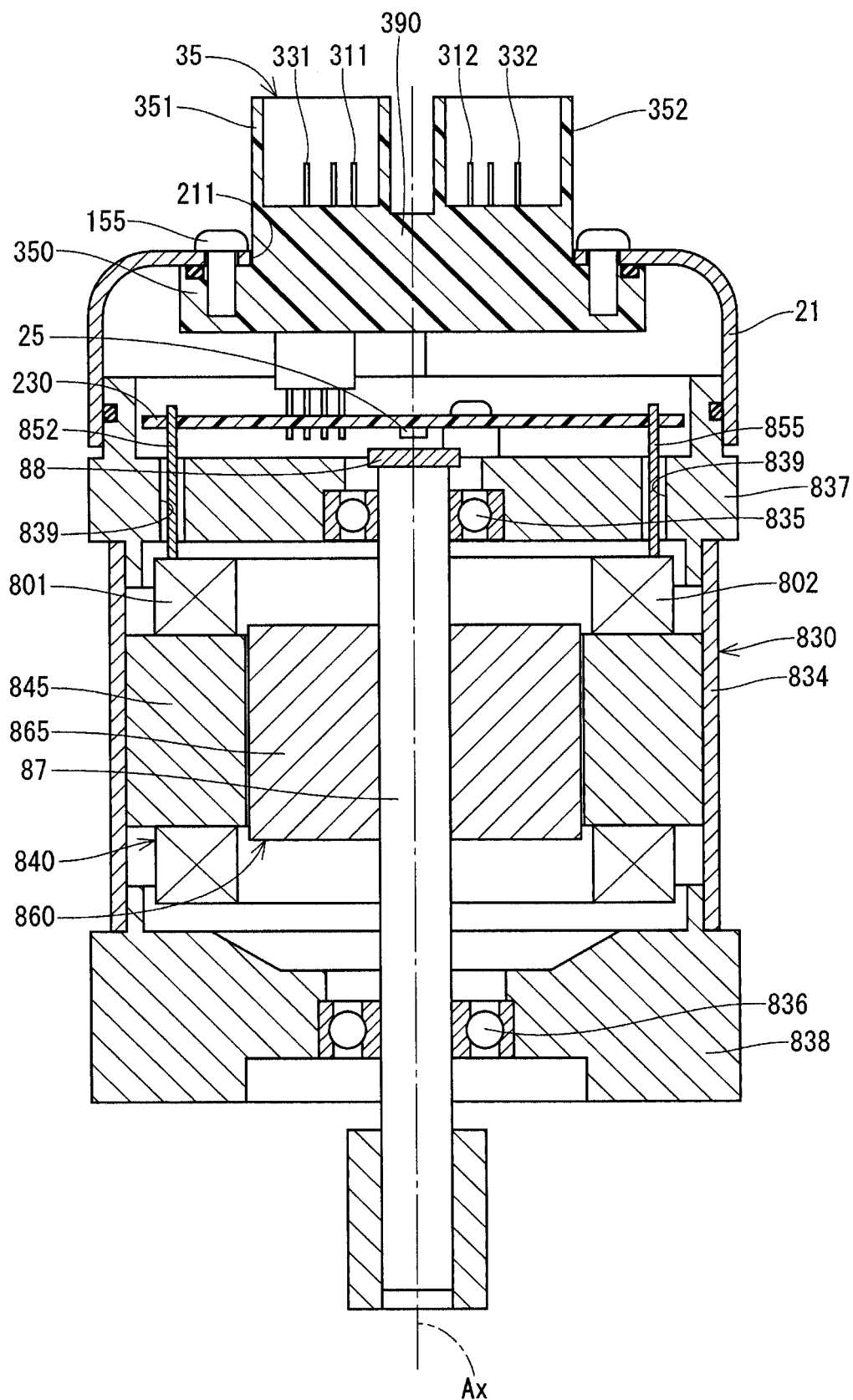
FIG. 21 is another vertical cross-sectional view of the drive device in the fourth embodiment taken along a line XXI-XXI in FIG. 20.

The fourth embodiment is shown in FIGS. 20 and 21. In the fourth embodiment, various electronic components of the controller are mounted on one substrate 230. In other words, the substrate of the controller may be provided as a single, one-piece board. Except for the configuration of the substrate 230, the fourth embodiment is configured similar to the configuration of the first embodiment, and can achieve the same advantageous effects as those of the first embodiment.

Other Embodiments

In other embodiments, the power may be supplied by a single power source that branches off to supply power to the individual systems. As such, the teachings of the above-described embodiments can be applied to the power terminals of a single power source configuration. That is, even when a single power supply is shared by a plurality of systems, a noise reduction effect may be realized by arranging a portion of the planar face of the positive electrode terminal and to overlap with a portion of the planar face.

In the descriptions of the first to fourth embodiments, the base portion 350 and the connectors 351 and 352 of the connector part 35 are described as being separate structural members from the cover 21. In other embodiments, the base portion, the connector, and the cover may be formed as a single member, i.e., as a single structure or as one body. In such a configuration, the terminals of the connectors may be connected to the substrate of the controller, for example, by a press fitting engagement. Alternatively, the substrate of the controller may be fixed to the connector, while having the lead wires of the winding set connected to the controller, for example, by press fitting.

In other embodiments, the motor may have two sets of winding wires arranged in-phase (i.e., in the same phase). The number of phases of the motor is not limited to three, but may be four or more. The motor to be driven by the drive device is not limited to an alternating current (AC) brushless motor, but may be a brushed direct current (DC) motor. In such cases, an H bridge circuit may be used as a "power converter."

In other embodiments, the drive device is not only applicable to an electric power steering apparatus, but may be applied to other electric motors.

Although the present disclosure is described by the above embodiments with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A drive device comprising:
a motor having a first set of winding wires and a second set of winding wires;
a controller disposed coaxially with the motor and configured to control the motor; and
a connector configured to connect to an external connector of an external cable to form a connection between the controller and the external connector, wherein
the controller has a first system control unit and a second system control unit, the first system control unit configured to control power supplied to the first set of winding wires and the second system control unit configured to control power supplied to the second set of winding wires, and wherein
the connector has a first positive electrode terminal and a first negative electrode terminal for power supplied to the first system control unit, and a second positive electrode terminal and a second negative electrode terminal for power supplied to the second system control unit, and wherein
a portion of a planar face of the first positive electrode terminal overlaps a portion of a planar face of the first negative electrode terminal,
a portion of a planar face of the second positive electrode terminal overlaps a portion of a planar face of the second negative electrode terminal,
the first positive electrode terminal and the first negative electrode terminal each have a rectangular-shaped cross-section having a long side and a short side, the long side of the cross-section of the first positive electrode terminal positioned to axially overlap the long side of the cross-section of the first negative electrode terminal when viewed along an axial direction of the motor, and
the second positive electrode terminal and the second negative electrode terminal each have a rectangular-shaped cross-section having a long side and a short side, the long side of the cross-section of the second positive electrode terminal positioned to axially overlap the long side of the cross-section of the second negative electrode terminal when viewed along the axial direction of the motor,
wherein to axially overlap comprises overlapping in a direction parallel to the axial direction of the motor.

2. The drive device of claim 1, wherein
the first positive electrode terminal and the second positive electrode terminal have a same shape, and
the first negative electrode terminal and the second negative electrode terminal have a same shape.

3. The drive device of claim 2, wherein
the connector has a first signal terminal for inputting a signal to the first system control unit and a second signal terminal for inputting a signal to the second system control unit, and wherein
the first positive electrode terminal, the first negative electrode terminal, and the first signal terminal are grouped together as a first system terminal group, and wherein
the second positive electrode terminal, the second negative electrode terminal, and the second signal terminal are grouped together as a second system terminal group, and wherein
the first system terminal group is positioned symmetrically to the second system terminal group about an axis of the motor.

4. The drive device of claim 3, wherein
the connector has a first system connector configured to hold the first system terminal group and a second system connector configured to hold the second system terminal group, and wherein
the first system terminal group is positioned symmetrically to the second system terminal group about the axis of the motor.

5. The drive device of claim 4, wherein
an insertion and removal direction of the first system connector and the second system connector is in a same direction as the axis of the motor, and wherein
the first system connector and the second system connector are rectangular-shaped connectors having long sides and short sides, and wherein
the first system connector is positioned adjacent to the second system connector to include a gap between the first system connector and the second system connector, and wherein
a distance of the gap is less than a width of the short sides of the first system connector and the second system connector, and wherein
one short side of the first system connector is aligned with one short side of the second system connector and another short side of the first system connector aligned with another short side of the second system connector, and wherein
each of the short sides of the first system connector has a boss that protrudes away from the first system connector that engages a lever of the external connector, and each of the short sides of the second system connector has a boss that protrudes away from the second system connector that engages a lever of the external connector.

6. The drive device of claim 5, wherein
a first lever to engage the boss of the first system connector is arranged to have an interference-free operation space thereabout for a switch operation between engagement and disengagement,
a second lever to engage the boss of the first system connector is arranged to have an interference-free operation space thereabout for a switch operation between engagement and disengagement, and
the interference-free operation space of the first lever and the interference-free operation space of the second lever are mutually opposite to each other relative to arrangement positions of the first lever and the second lever.

7. The drive device of claim 4, wherein
a rib is provided at a position between the first system connector and the second system connector for connecting the first system connector and the second system connector.

8. The drive device of claim 1, wherein
a substrate connection end of the first positive electrode terminal and a substrate connection end of the first negative electrode terminal are positioned along a line that is perpendicular to a virtual line that passes through an axis of the motor, and
a substrate connection end of the second positive electrode terminal and a substrate connection end of the second negative electrode terminal are positioned along a line that is perpendicular to the virtual line.

9. The drive device of claim 1, wherein
the long side of the cross-section of the second positive electrode terminal axially overlaps the long side of the cross-section of the second negative electrode terminal in a region defined between a base portion of the connector and a substrate of the controller.

* * * * *